US010459403B2

(12) United States Patent
Matsuoka et al.

(10) Patent No.: US 10,459,403 B2
(45) Date of Patent: Oct. 29, 2019

(54) END MEMBER, PHOTORECEPTOR DRUM UNIT, AND PROCESS CARTRIDGE

(71) Applicant: Mitsubishi Chemical Corporation, Chiyoda-ku (JP)

(72) Inventors: Yohei Matsuoka, Kanagawa (JP); Shuichi Ikeda, Kanagawa (JP); Yasunori Kawai, Kanagawa (JP); Kozo Ishio, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/977,362

(22) Filed: May 11, 2018

(65) Prior Publication Data

US 2018/0259898 A1 Sep. 13, 2018

Related U.S. Application Data

(63) Continuation of application No. PCT/JP2016/083427, filed on Nov. 10, 2016.

(30) Foreign Application Priority Data

Nov. 12, 2015 (JP) .................................. 2015-222469

(51) Int. Cl.
*G03G 21/18* (2006.01)
*F16D 3/16* (2006.01)
(Continued)

(52) U.S. Cl.
CPC .............. *G03G 21/186* (2013.01); *F16D 3/16* (2013.01); *F16D 3/20* (2013.01); *F16D 3/2052* (2013.01);
(Continued)

(58) Field of Classification Search
CPC ...... G03G 21/186; G03G 15/00; G03G 21/16; G03G 21/1671; F16D 3/16; F16D 3/20; F16D 3/2052
(Continued)

(56) References Cited

U.S. PATENT DOCUMENTS

2010/0034561 A1 2/2010 Batori et al.
2011/0182619 A1 7/2011 Batori et al.
(Continued)

FOREIGN PATENT DOCUMENTS

EP 2 790 065 A1 10/2014
JP 2010-26473 2/2010
(Continued)

OTHER PUBLICATIONS

International Search Report dated Feb. 14, 2017 in PCT/JP2016/083427, filed on Nov. 10, 2016 (with English Translation).
(Continued)

*Primary Examiner* — Francis C Gray
(74) *Attorney, Agent, or Firm* — Oblon, McClelland, Maier & Neustadt, L.L.P.

(57) ABSTRACT

An end member disposed in an end portion of a columnar rotating body, comprising: a shaft member; and a bearing member to which the shaft member is attached, wherein the bearing member includes a rotating force transmission pin, a tubular body, and a pin holding portion, the shaft member includes a rotating shaft, a rotating force receiving portion, and a base end portion.

8 Claims, 32 Drawing Sheets

(51) Int. Cl.
  *G03G 15/00* (2006.01)
  *G03G 21/16* (2006.01)
  *F16D 3/20* (2006.01)
  *F16D 3/205* (2006.01)

(52) U.S. Cl.
  CPC .............. *G03G 15/00* (2013.01); *G03G 21/16* (2013.01); *G03G 21/1671* (2013.01)

(58) Field of Classification Search
  USPC ........................................................ 399/167
  See application file for complete search history.

(56) References Cited

U.S. PATENT DOCUMENTS

| | | | |
|---|---|---|---|
| 2011/0255900 A1* | 10/2011 | Zhou | G03G 15/757 399/111 |
| 2013/0230337 A1 | 9/2013 | Batori et al. | |
| 2013/0322923 A1 | 12/2013 | Ikeda | |
| 2014/0086632 A1 | 3/2014 | Batori et al. | |
| 2014/0086633 A1 | 3/2014 | Batori et al. | |
| 2015/0093150 A1 | 4/2015 | Xiao et al. | |
| 2015/0110522 A1 | 4/2015 | Ikeda et al. | |
| 2015/0185693 A1* | 7/2015 | Wang | G03G 21/1857 399/111 |
| 2016/0048103 A1* | 2/2016 | Ikeda | F16D 1/06 399/111 |
| 2016/0246250 A1* | 8/2016 | Kamoshida | G03G 21/1853 |
| 2016/0259290 A1 | 9/2016 | Ikeda | |
| 2017/0219985 A1* | 8/2017 | Iijima | G03G 15/757 |

FOREIGN PATENT DOCUMENTS

| | | |
|---|---|---|
| JP | 2014-197158 | 10/2014 |
| JP | 2015034565 A * | 2/2015 |
| JP | 2015-99366 | 5/2015 |
| JP | 2015-121776 | 7/2015 |
| WO | WO 2014/136992 A1 | 9/2014 |

OTHER PUBLICATIONS

Written Opinion dated Feb. 14, 2017 in PCT/JP2016/083427, filed on Nov. 10, 2016.
Technical Disclosure No. 2010-502200 filed on Apr. 22, 2010, 31 pages.
Extended European Search Report dated Nov. 2, 2018 in European Patent Application No. 16864327.8, citing documents AA, AB, AO and AP therein, 7 pages.

* cited by examiner

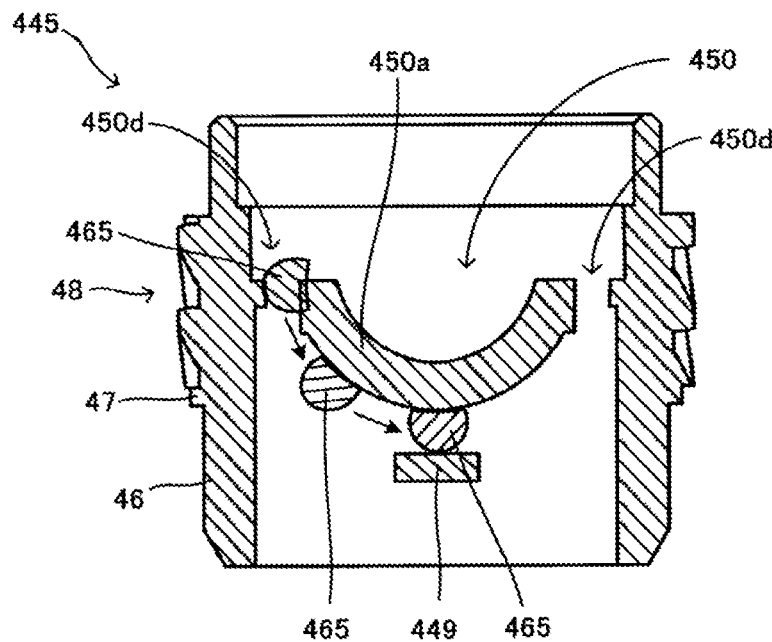
Fig. 33
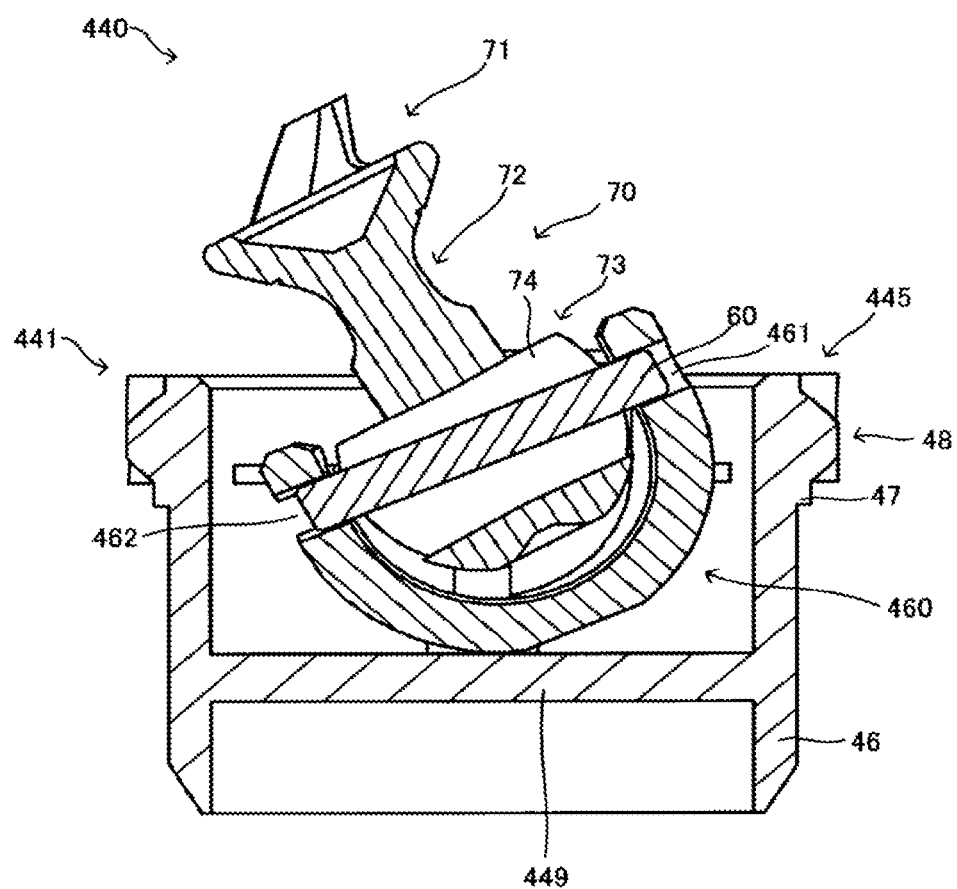

END MEMBER, PHOTORECEPTOR DRUM UNIT, AND PROCESS CARTRIDGE

CROSS-REFERENCE TO RELATED APPLICATIONS

This application is a Continuation of PCT/JP2016/083427, which was filed on Nov. 10, 2016. This application is based upon and claims the benefit of priority to Japanese Application No. 2015-222469, which was filed on Nov. 12, 2015.

TECHNICAL FIELD

The present invention relates to a process cartridge which is attachable to and detachable from an image forming apparatus, such as a laser printer or a copying machine, a photoreceptor drum unit which is provided in the process cartridge, and an end member which is attached to a columnar rotating body, such as a photoreceptor drum or a developing roller.

BACKGROUND ART

In an image forming apparatus, such as a laser printer or a copying machine, a process cartridge which is attachable to and detachable from a main body (hereinafter, referred to as an "apparatus main body") of the image forming apparatus is provided.

The process cartridge is a member which forms contents to be expressed by letters or figures and transfers the contents to a recording medium, such as a paper sheet. More specifically, in the process cartridge, the photoreceptor drum is included, and the contents to be transferred are formed onto the photoreceptor drum. In addition, in the process cartridge, various other means for forming the contents to be transferred onto the photoreceptor drum are also disposed. Examples of the means include a developing roller unit, a charging roller unit, and means for performing cleaning.

The process cartridge attaches and detaches the same process cartridge to and from the apparatus main body for maintenance, or disengages an old process cartridge from the apparatus main body and mounts a new process cartridge on the apparatus main body. Attaching and detaching the process cartridge in this manner can be performed by users of the image forming apparatus themselves, and from this point of view, it is desirable to perform attaching and detaching as easily as possible.

Meanwhile, the photoreceptor drum included in the process cartridge is configured to be engaged with a driving shaft of the apparatus main body directly or via another member, and accordingly, to receive a rotating force from the driving shaft and to rotate. Therefore, in order to attach and detach the process cartridge to and from the apparatus main body, it is necessary to release (disengage) the engagement between the driving shaft of the apparatus main body and the photoreceptor drum every time attaching and detaching occur, and to mount the process cartridge again.

Here, if it is possible to move the photoreceptor drum (process cartridge) in the shaft line direction of the driving shaft of the apparatus main body, and to attach and detach the photoreceptor drum to and from the driving shaft, the configuration of the apparatus can be relatively simple. However, from the viewpoint of reducing the image forming apparatus in size or ensuring an attachment and detachment space of the process cartridge, it is preferable to disengage the process cartridge from the apparatus main body to be pulled out in the direction which is different from the shaft line direction of the driving shaft, and to mount the process cartridge on the apparatus main body to be pushed in a direction opposite to the direction.

In PTL 1, a configuration for attaching and detaching a process cartridge in a direction different from the shaft line direction of the driving shaft of the apparatus main body, is disclosed. Specifically, a coupling member described in PTL 1 is swingably attached to a drum flange (bearing member) by providing a spherical portion. Therefore, a part (rotating force receiving member) which is provided in the coupling member and is engaged with the driving shaft of the apparatus main body can swing around the spherical portion and change an angle with respect to the shaft line of the photoreceptor drum, and it is easy to mount and disengage the driving shaft of the apparatus main body and the photoreceptor drum to and from each other.

In addition, in the invention described in NPL 1, in a structure in which a swinging shaft member is linked to a bearing member, a groove for introducing a rotating force transmission pin provided in the shaft member into the bearing member is provided on an inner circumferential side of the bearing member. The groove is formed so as to extend in a rotation direction, and it becomes easy to attach the rotating force transmission pin to the bearing member by the groove.

CITATION LIST

Patent Literature

[PTL 1] JP-A-2010-26473

Non Patent Literature

[NPL 1] Japan Institute of Invention and Innovation, Journal of technical disclosure 2010-502200

SUMMARY OF INVENTION

Technical Problem

However, in the inventions described in PTL 1 and NPL 1, it is difficult to realize smooth attachment of the shaft member to the bearing member, smooth swinging of the shaft member, and smooth attachment and detachment to and from the apparatus main body of the shaft member. Specifically, for example, high accuracy is required for each member in order to exhibit necessary functions, and the influence on the performance due to the variation in quality of the shaft member is great.

In addition, in the structure of the coupling member and the drum flange (bearing member) for holding the coupling member described in PTL 1, since the spherical portion is directly held by the drum flange while the coupling member can swing, it is necessary to forcibly insert and forcibly pull out the spherical portion when attaching the spherical portion to the drum flange (bearing member). Such forcibly inserting and forcibly pulling out are concerned about scratching the shaft member, and there is a problem in workability, for example, reuse of the shaft member is affected.

Here, in consideration of the above-described problems, an object of the present invention is to provide an end member which can transmit the same rotating force as that in the conventional art, can be attached and detached to and from the apparatus main body, operates more smoothly, and is unlikely to receive influence of variations in quality of the shaft member. In addition, a photoreceptor drum unit and a process cartridge are provided.

Solution to Problem

Hereinafter, the present invention will be described.

One embodiment of the present invention is an end member which is disposed in an end portion of a columnar rotating body, comprising: a shaft member; and a bearing member to which the shaft member is attached, wherein the bearing member includes a rotating force transmission pin for transmitting a rotating force from the shaft member to the bearing member, a tubular body, and a pin holding portion which is disposed on an inside of the tubular body, holds the rotating force transmission pin, and regulates attachment and detachment of the rotating force transmission pin, wherein the pin holding portion is configured to be capable of attaching and detaching the rotating force transmission pin to and from the pin holding portion by rotating the shaft member in a circumferential direction of the tubular body, wherein the shaft member includes a rotating shaft, a rotating force receiving portion which is provided on one end side of the rotating shaft, is engageable with a rotating force applying portion of an image forming apparatus main body, and receives a rotating force from a driving shaft in an engaged posture, and a base end portion which is disposed on the other end side of the rotating shaft and has a hole through which the rotating force transmission pin passes, and wherein the hole is formed to be greater such that the shaft member is capable of swinging with respect to the rotating force transmission pin.

The other embodiment of the present invention is an end member which is disposed in an end portion of a columnar rotating body, comprising: a shaft member; and a bearing member to which the shaft member is attached, wherein the shaft member includes a rotating shaft, a rotating force receiving portion which is provided on one end side of the rotating shaft, is engageable with a rotating force applying portion of an image forming apparatus main body, and receives a rotating force from a driving shaft in an engaged posture, a base end portion which is disposed on the other end side of the rotating shaft, and a rotating force transmission pin for transmitting the rotating force to a bearing member, wherein a hole through which the rotating force transmission pin passes is provided in the base end portion, and the shaft member is capable of swinging as the hole is greater with respect to the rotating force transmission pin, and wherein the bearing member includes a tubular body, a holding portion which is disposed on an inside of the tubular body, and is a recess portion that holds the rotating force transmission pin, a projection-like regulating member which extends in the circumferential direction for regulating attachment and detachment of the rotating force transmission pin, and a groove which extends in a circumferential direction in order to make the regulating member retract.

The other embodiment of the present invention is a photoreceptor drum unit comprising: the end member above, and a photoreceptor drum which is the columnar rotating body.

The other embodiment of the present invention is a process cartridge comprising: a housing; and the photoreceptor drum unit above which is held by the housing.

Advantageous Effects of Invention

According to the present invention, smooth rotation (swinging of the shaft member) becomes possible. At this time, since the rotation (swinging of the shaft member) is performed without causing the rotating force transmission pin to swing, it is not necessary to provide a part for swinging the rotating force transmission pin, and it is possible to ensure sufficiently smooth swinging even when there is a slight dimensional variation or likes.

BRIEF DESCRIPTION OF DRAWINGS

FIG. 32 is a view for describing a situation in which the intermediate member 460 is attached to the main body 445.

FIG. 33 is a view for describing tilting of an end member 440.

DESCRIPTION OF EMBODIMENTS

Figure 1:
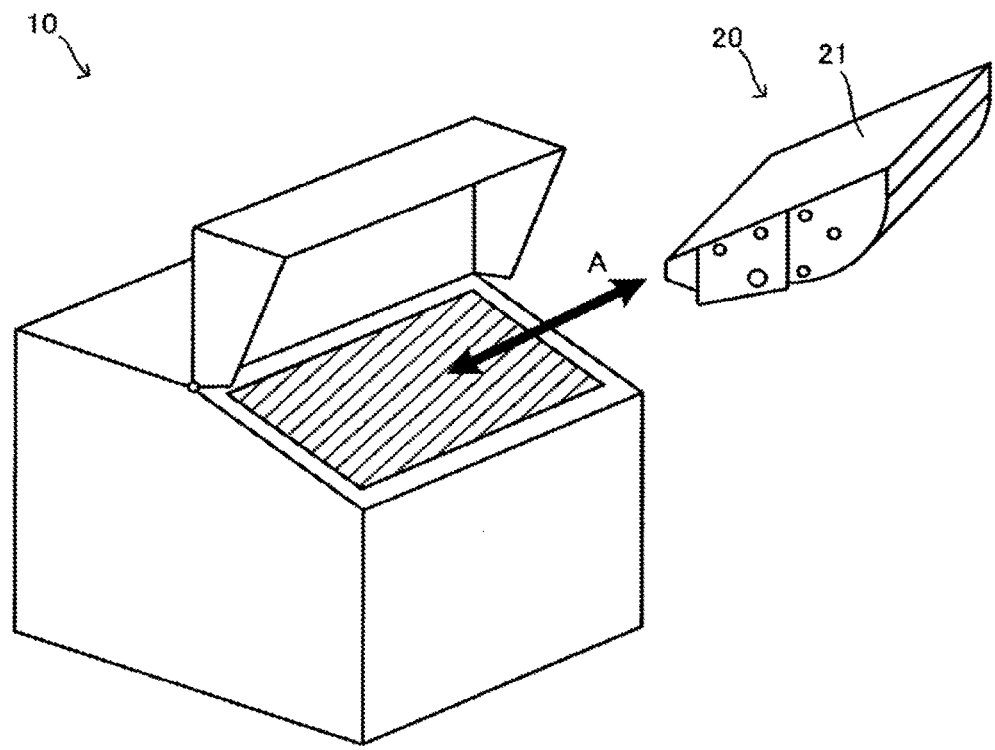
FIG. 1 is a schematic view of an image forming apparatus main body 10 and a process cartridge 20.

Hereinafter, the present invention will be described based on aspects illustrated in the drawings. However, the present invention is not limited to the aspects. In addition, in each of the drawings, for the description, members are expressed being omitted and seen through, or the shape is exaggerated as necessary. In addition, in sectional views, hatching may be applied to a surface that becomes an end surface.

FIG. 1 is a view describing a first aspect, and is a perspective view schematically illustrating a process cartridge 20 including an end member 40 (refer to FIG. 3) and an image forming apparatus main body 10 (hereinafter, there is a case of being described as "apparatus main body 10") which mounts and uses the process cartridge 20. As illustrated in FIG. 1, the process cartridge 20 can be mounted on the apparatus main body 10 by moving in a direction indicated by A in FIG. 1, and can be disengaged from the apparatus main body 10. The direction (A) is a direction different from the shaft line direction of the driving shaft of the apparatus main body 10. In addition, the apparatus main body 10 and the process cartridge 20 configure an image forming apparatus. Hereinafter, details will be described.

Figure 2:
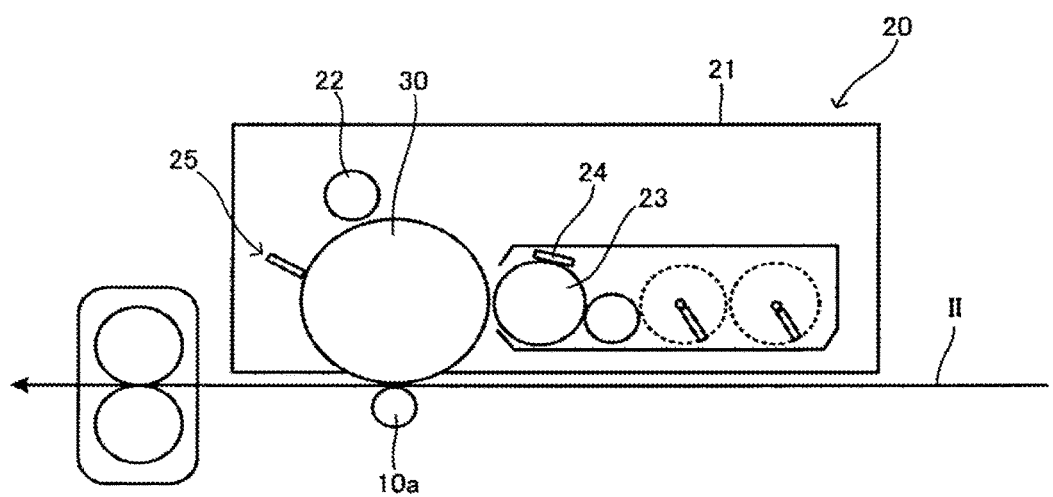
FIG. 2 is a view schematically illustrating a structure of the process cartridge 20.

In FIG. 2, a structure of the process cartridge 20 is schematically illustrated. As can be ascertained from FIG. 2, the process cartridge 20 includes a photoreceptor drum unit 30 (refer to FIG. 3A) on the inside of a housing 21, a charging roller unit 22, a developing roller unit 23, a regulating member 24, and a cleaning blade 25. In a posture in which the process cartridge 20 is mounted on the apparatus main body 10, as a recording medium, such as a paper sheet, moves along line indicated by II in FIG. 2, an image is transferred to the recording medium from the photoreceptor drum unit 30.

In addition, the attachment and detachment of the process cartridge 20 to and from the apparatus main body 10 is generally performed as follows. In the aspect, as the photoreceptor drum unit 30 provided in the process cartridge 20 receives a rotation driving force from the apparatus main body 10, and rotates, a state where a driving shaft 11 (refer to FIG. 16A) of the apparatus main body 10 and an end member 40 (refer to FIG. 3B) of the photoreceptor drum unit 30 are engaged with each other at least during the operation, and the rotating force can be transmitted, is achieved (refer to FIG. 16B).

Meanwhile, when attaching and detaching the process cartridge 20 to and from the apparatus main body 10, it is necessary that the driving shaft 11 and the end member 40 are promptly engaged and disengaged not to interrupt the movement or rotation each other regardless of the posture.

In this manner, the end member 40 of the photoreceptor drum unit 30 is appropriately engaged with the driving shaft 11 of the apparatus main body 10, and the rotation driving force is transmitted.

Hereinafter, each configuration will be described.

In the process cartridge 20, as can be ascertained from FIG. 2, the charging roller unit 22, the developing roller unit 23, the regulating member 24, the cleaning blade 25, and the photoreceptor drum unit 30 are provided, and these members are included inside the housing 21. Each of these is as follows.

The charging roller unit 22 charges a photoreceptor drum of the photoreceptor drum (columnar rotating body) 35 (refer to FIG. 3A) of the photoreceptor drum unit 30 by applying voltage from the apparatus main body 10. The charging is performed as the charging roller unit 22 rotates following the photoreceptor drum 35, and comes into contact with an outer circumferential surface of the photoreceptor drum 35.

The developing roller unit 23 is a member which includes a roller that supplies a developer to the photoreceptor drum 35. In addition, an electrostatic latent image formed on the photoreceptor drum 35 is developed by the developing roller unit 23. In addition, in the developing roller unit 23, a fixed magnet is embedded.

The regulating member 24 is a member which adjusts an amount of developer adhered onto the outer circumferential surface of the above-described developing roller unit 23, and applies a frictional electrification charge to the developer itself.

The cleaning blade 25 is a blade which comes into contact with the outer circumferential surface of the photoreceptor drum 35, and removes the developer remaining after the transfer by a tip end thereof.

Figure 3A:
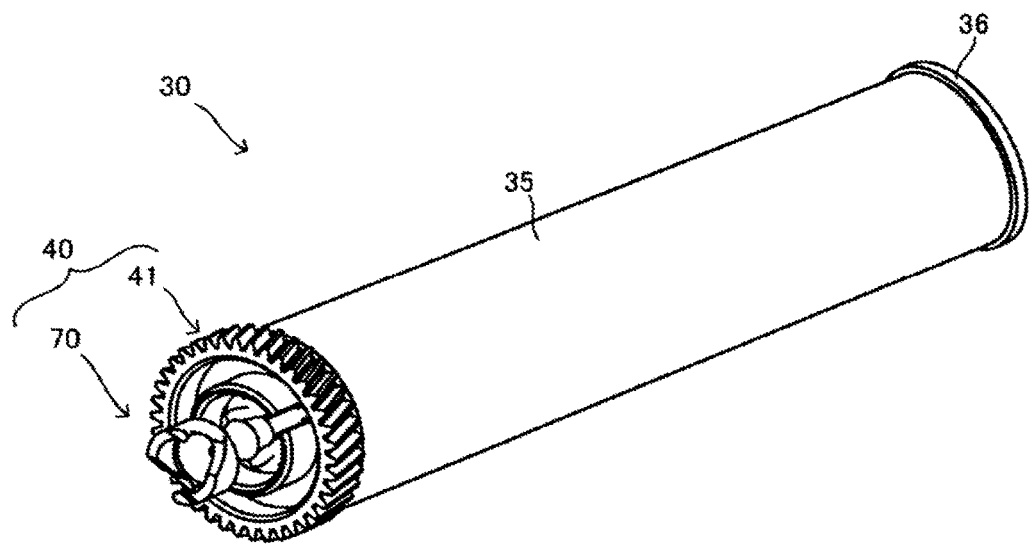
FIG. 3A is an external perspective view of a photoreceptor drum unit 30.
Figure 3B:
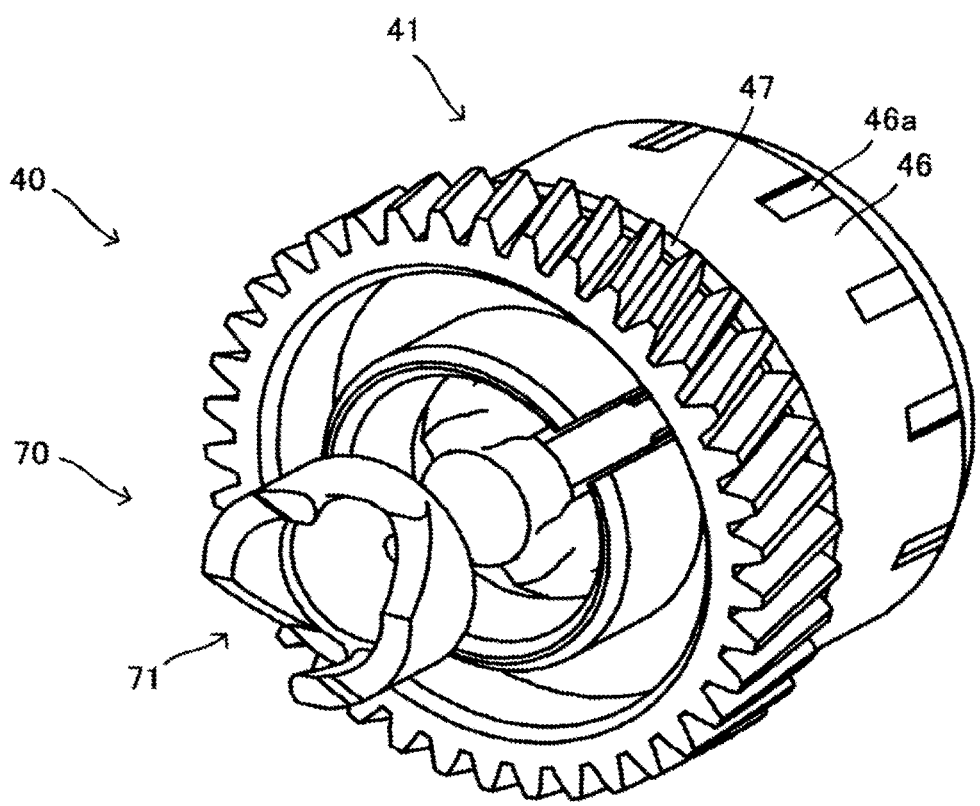
FIG. 3B is an external perspective view of an end member 40.

The photoreceptor drum unit 30 is a member in which letters or figures to be transferred to the recording medium, such as a paper sheet, are formed on a surface thereof. FIG. 3A illustrates an external perspective view of the photoreceptor drum unit 30. As can be ascertained from FIG. 3A, the photoreceptor drum unit 30 includes a photoreceptor drum 35, a lid material 36, and an end member 40. FIG. 3B is a perspective view focusing on the end member 40. Hereinafter, the photoreceptor drum unit 30 will be described with reference to FIGS. 3A and 3B and appropriately illustrated views.

The photoreceptor drum 35 is a member which covers a photoreceptor layer on the outer circumferential surface of a drum cylinder (referred to as "base body" in some cases) which is a columnar rotating body. In other words, the drum cylinder is a conductive cylinder made of aluminum or the like, and here, the cylinder is coated with the photoreceptor layer. An end member 40 is attached to one end of the photoreceptor drum 35 as will be described later, and a lid material 36 is disposed at the other end. In the aspect, the drum cylinder is a hollow cylindrical shape, but may be a solid round bar shape. However, at least the lid material 36 and the end member 40 are formed so as to be appropriately attached to the end portion thereof.

The lid material 36 is a member made of a resin, and a fitting portion fitted to the inside of the cylinder of the photoreceptor drum 35 and a bearing portion disposed so as to cover one end surface of the photoreceptor drum 35 are coaxially formed. The bearing portion is in a disk shape which covers the end surface of the photoreceptor drum 35 and has a part for receiving the shaft provided in the process cartridge. In addition, on the lid material 36, an earth plate made of a conductive material is disposed, and accordingly, electrically connects the photoreceptor drum 35 and the apparatus main body 10 to each other.

In addition, in the aspect, although an example of a lid material is illustrated in the aspect, not being limited thereto, and another aspect of lid material which can be normally adopted is also possible. For example, a gear for transmitting the rotating force may be disposed on the lid material. In addition, the conductive material may be provided on the end member 40 side which will be described later.

The end member 40 is a member which is attached to the end portion opposite to the lid material 36 among the end portions of the photoreceptor drum 35, and is provided with a bearing member 41 and a shaft member 70.

Figure 4:
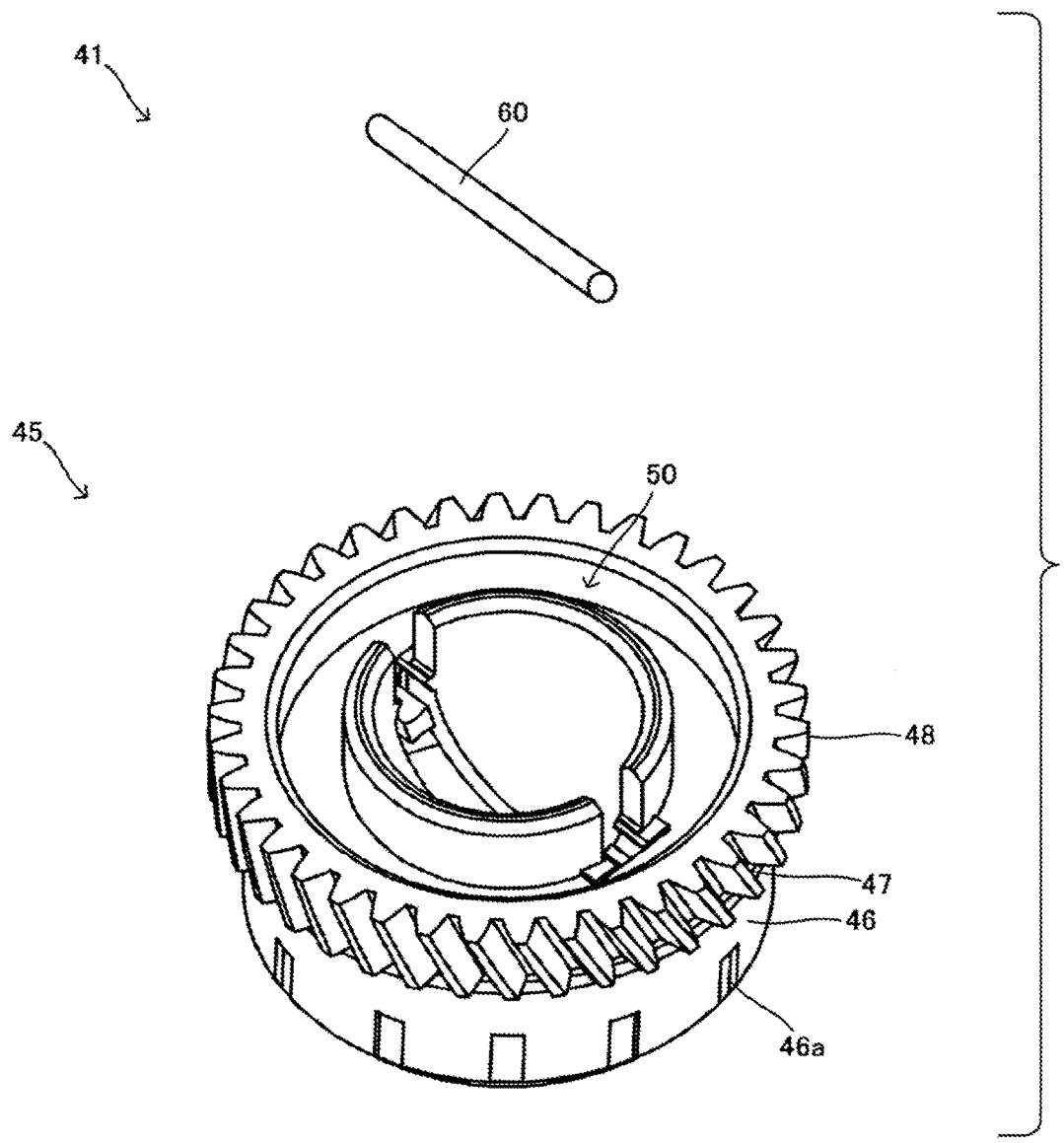
FIG. 4 is an exploded perspective view of a bearing member 41.

The bearing member 41 is a member fixed to the end portion of the photoreceptor drum 35. FIG. 4 is an exploded perspective view of the bearing member 41. As can be ascertained from FIG. 4, the bearing member 41 is provided with a main body 45 and a rotating force transmission pin 60 which is a cylindrical rod-shaped member. Each of these will be described.

Figure 5A:
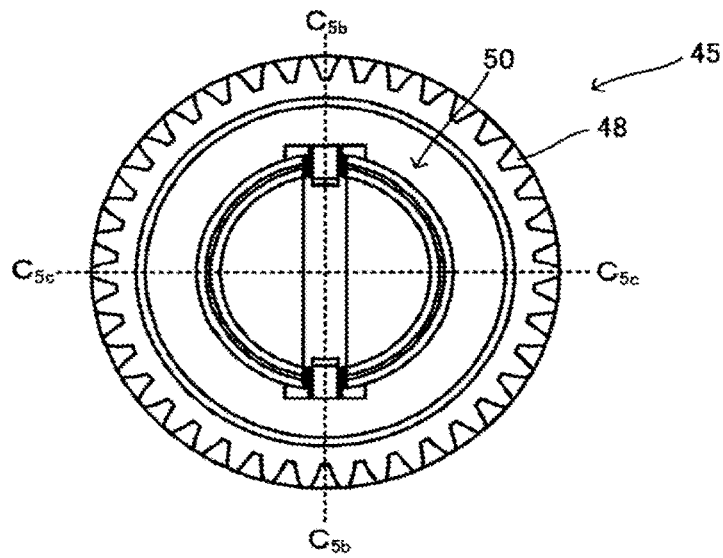
FIG. 5A is a plan view of a main body 45 of the bearing member 41.
Figure 5B:
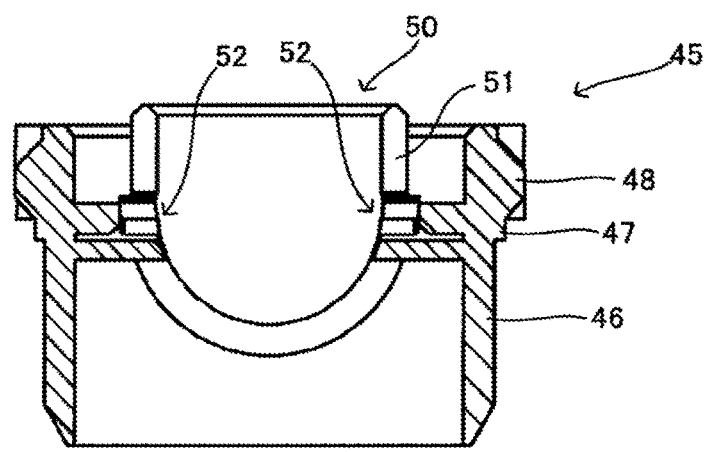
FIG. 5B is one sectional view of the main body 45 of the bearing member 41.
Figure 5C:
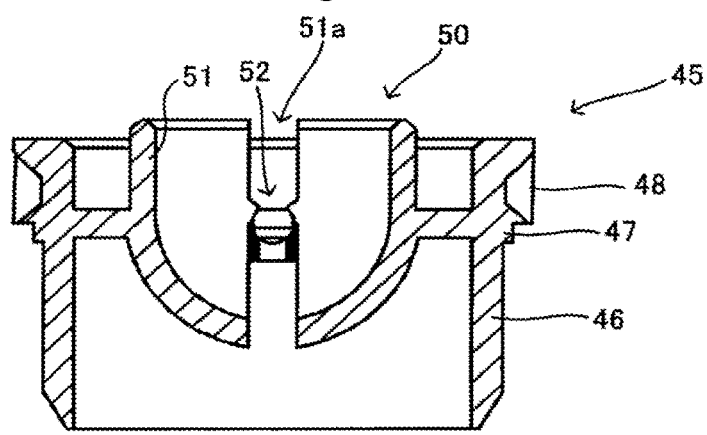
FIG. 5C is another sectional view of the main body 45 of the bearing member 41.

FIG. 5A illustrates a view (plan view) of the main body 45 when viewed from the side on which the rotating force transmission pin 60 is inserted, FIG. 5B illustrates a sectional view along the line indicated by $C_{5b}$-$C_{5b}$ in FIG. 5A, and FIG. 5C is a sectional view along the line $C_{5c}$-$C_{5c}$ in FIG. 5A, respectively.

In the aspect, the main body 45 includes a tubular body 46 which is cylindrical as can be ascertained from FIGS. 3 to 5. In addition, on the outer circumferential surface of the tubular body 46, a ring-shaped contact wall 47 and a gear 48 are formed to stand upright along the outer circumferential surface. The outer diameter of the tubular body 46 is substantially the same as the inner diameter of the photoreceptor drum 35, one end side of the tubular body 46 is inserted into the photoreceptor drum 35 and fitted thereto, and accordingly, the main body 45 is fixed to the photoreceptor drum 35. At this time, the end surface of the photoreceptor drum 35 is inserted to a depth at which the end surface abuts against the contact wall 47. At this time, an adhesive may be used for more firm fixation. In addition, a groove 46a or irregularities may be provided in the tubular body 46 at the part at which the adhesive is disposed. Accordingly, the adhesive is held in the groove 46a or a recess portion, and the adhesion between the photoreceptor drum 35 and the main body 45 is further strengthened.

The gear 48 is a gear which transmits the rotating force to the developing roller unit 23, and in the aspect, a helical gear is disposed. The type of the gear is not particularly limited, and may be a spur gear or the like. However, gears are not necessarily provided.

A holding portion 50 is provided on the tubular inside of the tubular body 46. The holding portion 50 is a part which holds the rotating force transmission pin 60 and encloses one end side of a shaft member 70 (to be described later) on the inside thereof. As can be ascertained from FIGS. 4 and 5, the holding portion 50 is provided with a shaft member accommodation portion 51 and a pin holding portion 52.

The shaft member accommodation portion 51 is a member which accommodates one end side of the shaft member 70 on the inside thereof, and forms the pin holding portion 52. In the aspect, the shaft member accommodation portion 51 is a cylindrical body which is coaxial to the tubular body 46, and the bottom portion thereof has a shape of a spherical surface. The spherical surface is curved in a spherical shape so as to receive a spherical surface of a spherical body 73 provided on one end side of the shaft member 70 which will be described later. However, it is not necessary that the bottom portion has a shape of a spherical surface, and the bottom portion may not be necessarily provided.

In the shaft member accommodation portion 51, grooves 51a are formed in the shaft line direction on one side and the other side which oppose each other across the shaft line. The groove 51a is formed to be greater than the diameter of the rotating force transmission pin 60 such that the inside of the groove 51a can move the end portion of the rotating force transmission pin 60.

Figure 6:
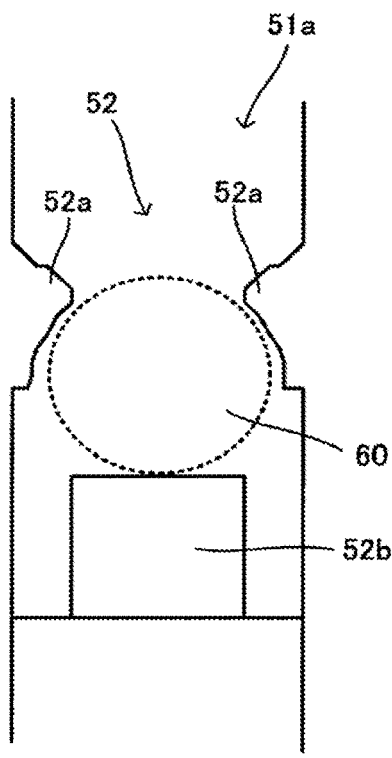
FIG. 6 is a view for describing a pin holding portion 52.
Figure 7:
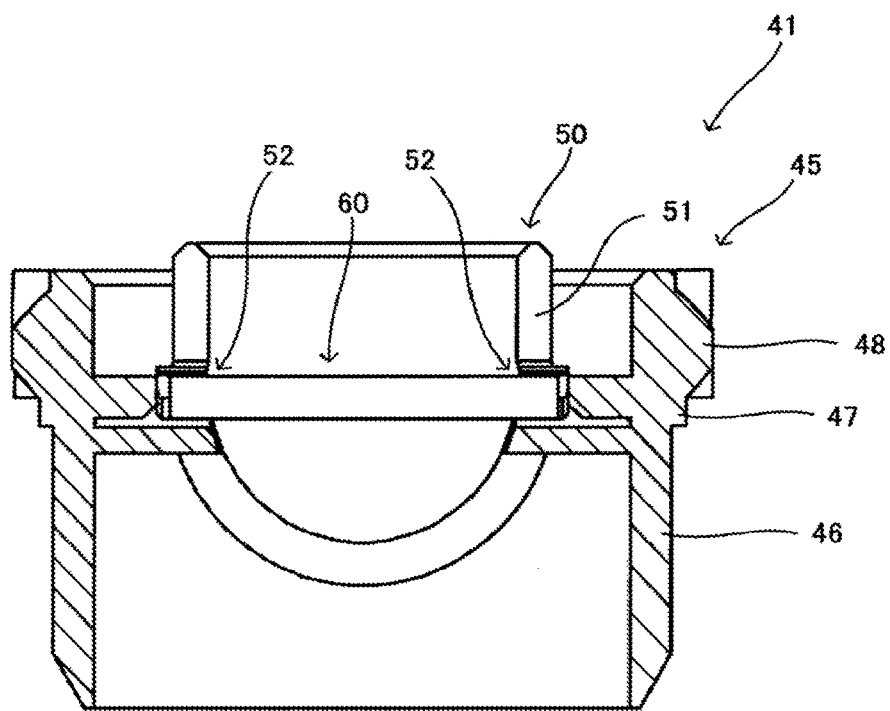
FIG. 7 is a sectional view of the bearing member 41.

The pin holding portion 52 is a part which is formed in the groove 51a of the shaft member accommodation portion 51, holds one end and the other end of the rotating force transmission pin 60, and accordingly, holds the rotating force transmission pin 60 to the main body 45. FIG. 6 illustrates an enlarged view of a part of the pin holding portion 52 at the same viewpoint as FIG. 5C. In FIG. 6, a broken line illustrates the rotating force transmission pin 60 disposed therein. FIG. 7 illustrates a view in which the rotating force transmission pin 60 is mounted at the viewpoint of FIG. 5B.

As can be ascertained from FIG. 5B, the pin holding portion 52 is provided in the groove 51a and is disposed at two positions so as to oppose each other across the shaft line.

As can be ascertained from FIG. 6, the pin holding portion 52 includes a seat 52b which supports a side surface of the end portion of the rotating force transmission pin 60, and a presser foot 52a on a projection which prevents the rotating force transmission pin 60 from being pulled out to the side opposite to the seat 52b.

When mounting the rotating force transmission pin 60 on the pin holding portion 52, the pin holding portion 52 is configured so as not to necessarily attach the rotating force transmission pin 60 to the main body 45 from the sides (lower sides of paper surfaces of FIGS. 5B, 5C, 6, and 7)

opposite to a side on which the shaft member 70 protrudes. Accordingly, the structure of the bearing member 41 can further be simplified.

As can be ascertained from FIG. 6 as a specific example, in the pin holding portion 52 of the aspect, the seat 52*b* is disposed on the side opposite to the side on which the shaft member 70 protrudes (lower side of the paper surface), and the presser foot 52*a* is disposed on the side on which the shaft member 70 protrudes (upper side of the paper surface). In addition, the presser foot 52*a* is configured to have a snap-fit structure such that the end portion of the rotating force transmission pin 60 can be attached and detached and held in a state where the end member is attached to the photoreceptor drum 35. In other words, two presser foots 52*a* are disposed to oppose each other with a gap narrower than the diameter of the rotating force transmission pin 60. In addition, when the rotating force transmission pin 60 passes through the gap, the passage is possible by being elastically deformed. In addition, the attachment and detachment are performed on the side on which the shaft member 70 protrudes (upper side of the paper surface of FIG. 6).

A material which configures the main body 45 is not particularly limited, but a resin, such as polyacetal, polycarbonate, or PPS can be used. Here, in order to improve the rigidity of the member, the glass fiber or the carbon fiber may be mixed into the resin in accordance with the load torque. In addition, in order to make the swinging smooth when attaching the shaft member 70 to the main body 45, sliding properties may be improved by containing at least one type of a fluorine, polyethylene, and silicon rubber in the resin. In addition, the resin may be coated with fluorine or lubricant.

Figure 8A:
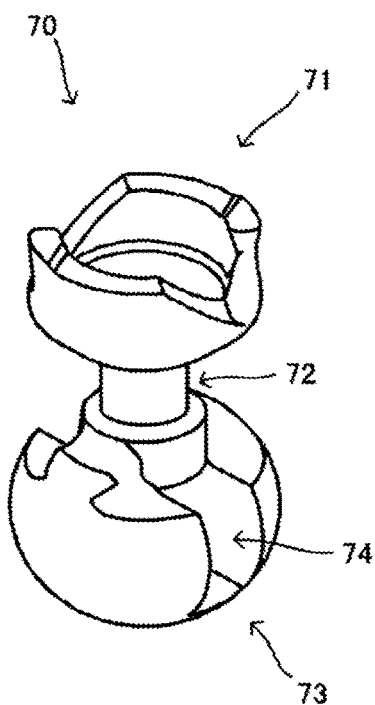
FIG. 8A is a sectional view of a shaft member 70.
Figure 8B:
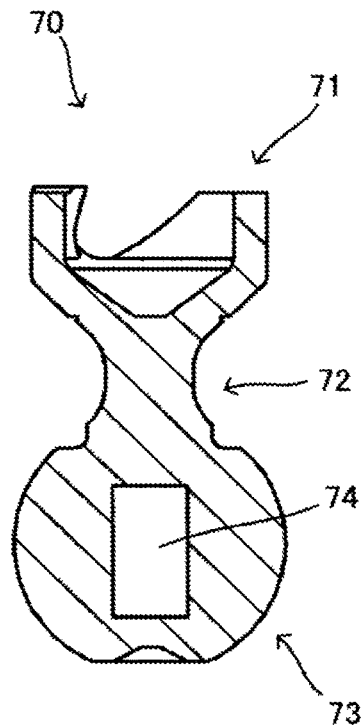
FIG. 8B is a sectional view of the shaft member 70.
Figure 8C:
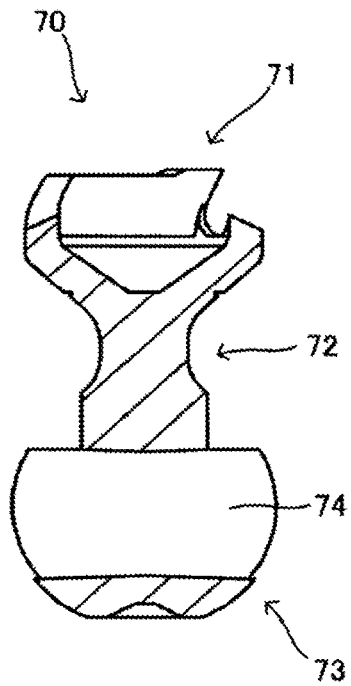
FIG. 8C is another sectional view of the shaft member 70.

Next, the shaft member 70 of the end member 40 will be described. FIG. 8A is a perspective view of the shaft member 70, FIG. 8B is one sectional view of the shaft member 70 along the shaft line direction, and FIG. 8C illustrates another sectional view of the shaft member 70 along the shaft line direction. The two sectional views in FIGS. 8B and 8C are sectional views of the sections which are deviated by 90° from the shaft line. As can be ascertained from FIGS. 8A, 8B, and 8C, the shaft member 70 is provided with a coupling member 71, a rotating shaft 72, and a spherical body 73.

The coupling member 71 is a part that functions as a rotating force receiving portion which receives a rotation driving force from the apparatus main body 10 (refer to FIG. 1). The coupling member 71 is a member having a shape of a circular dish, and is configured to receive the rotation driving force from the driving shaft 11 (refer to FIG. 16A) of the apparatus main body 10. How the rotating force can be received from the driving shaft 11 will be described later. In addition, as an aspect of the coupling member 71 that can receive the rotating force in this manner, a known aspect can be applied, and the aspect is not particularly limited.

The rotating shaft 72 is a columnar shaft-like member that functions as a rotating force transmission portion which transmits the rotating force received by the coupling member 71. Therefore, the coupling member 71 is provided at one end of the rotating shaft 72.

The spherical body 73 functions as a base end portion, and is a spherical member in the aspect as can be ascertained from FIGS. 8A to 8C, and the end portion opposite to the side on which the coupling member 71 is disposed among the end portions of the rotating shaft 72 is regarded as the base end portion. In the aspect, the center of the spherical body 73 is preferably on the shaft line of the rotating shaft 72. Accordingly, it is possible to obtain more stable rotation of the photoreceptor drum 35. In addition, the diameter of the spherical body 73 is set to have the size within the shaft member accommodation portion 51 of the bearing member 41 described above.

In the aspect, a case where the base end portion is spherical has been described, but the present invention is not limited thereto, and the aspect is not particularly limited as long as an aspect which does not interrupt the swinging of the shaft member, for example, a member which has a partially spherical shape or which is formed by combining curved surfaces similar to an egg shape, is employed.

A hole 74 which extends in a direction orthogonal to the shaft line of the rotating shaft 72 and passes through the spherical body 73 is formed in the spherical body 73. The rotating force transmission pin 60 passes through the hole 74 as will be described later. In the section orthogonal to the extending direction, the hole 74 is formed to be substantially greater in the shaft line direction than the diameter of the rotating force transmission pin 60. Meanwhile, in the section, the hole 74 is formed to the extent of being substantially the same as the diameter of the rotating force transmission pin 60 in the direction orthogonal to the shaft line direction. From the viewpoint, it is preferable that the hole is rectangular in the section similar to the aspect.

Accordingly, as will be described later, the shaft member 70 can swing in all directions.

A material of the shaft member 70 is not particularly limited, but a resin, such as polyacetal, polycarbonate, or PPS can be used. However, in order to improve the rigidity of the member, the glass fiber or the carbon fiber may be mixed into the resin in accordance with the load torque. In addition, metal may be inserted into the resin to further improve the rigidity, or the entirety or a part thereof may be made of metal.

Figure 9A:
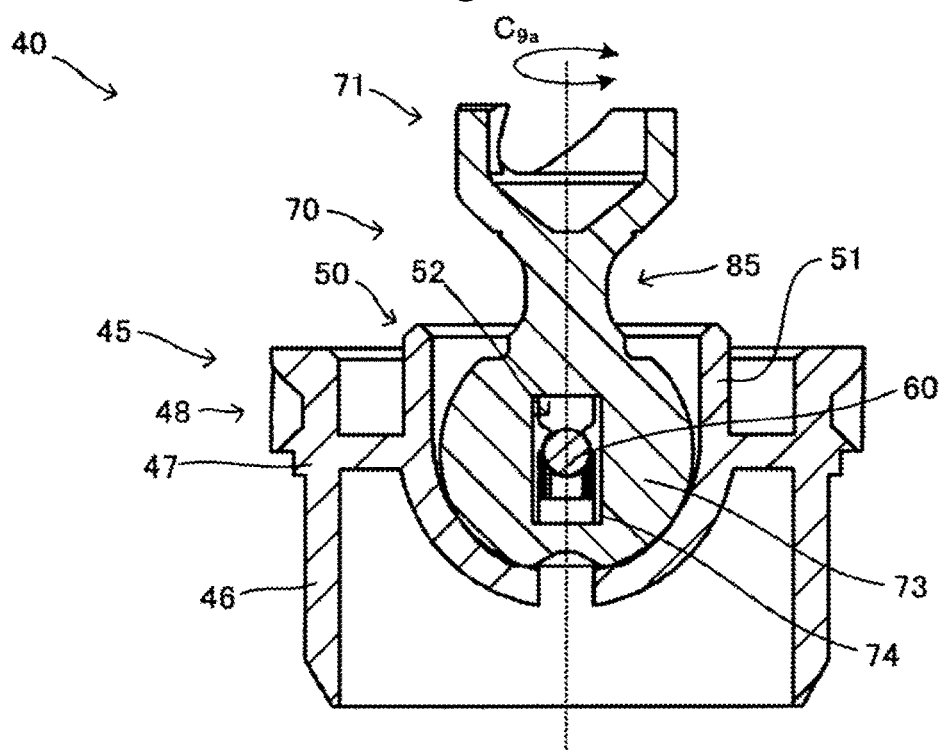
FIG. 9A is one sectional view of the end member 40.
Figure 9B:
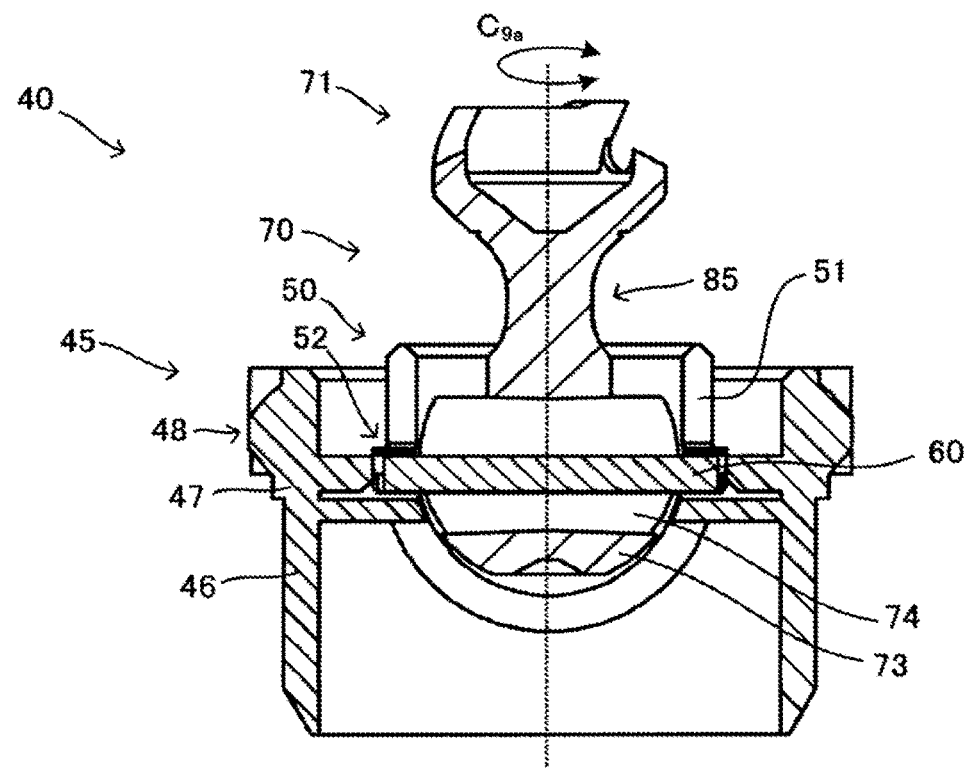
FIG. 9B is another sectional view of the end member 40.

By combining the bearing member 41 and the shaft member 70 with each other as follows, the end member 40 is made. By describing the combination, the shape, the size, or the positional relationship of the bearing member 41 and the shaft member 70 are further understood. FIG. 9A illustrates a sectional view of the end member 40 from the same viewpoint as in FIG. 5C, and FIG. 9B illustrates a sectional view of the end member 40 from the same viewpoint as FIG. 5B, respectively. In addition, FIG. 10A illustrates an example of the posture in which the shaft member 70 is inclined in the viewpoint illustrated in FIG. 9A, and FIG. 10B illustrates an example of the posture in which the shaft member 70 is inclined in the viewpoint illustrated in FIG. 9B.

As can be ascertained from FIGS. 9A and 9B, the rotating force transmission pin 60 is inserted into the hole 74 provided in the spherical body 73 of the shaft member 70, and both ends of the rotating force transmission pin 60 are respectively disposed to protrude from the spherical body 73. In addition, both ends of the protruding rotating force transmission pin 60 are held by the pin holding portion 52. When disposing the rotating force transmission pin 60 in the pin holding portion 52, the shaft member 70 is moved in the groove 51*a* from the side protruding from the bearing member 41, and the snap-fitted presser foot 52*a* passes therethrough. The pin retaining portion 52 may have a groove that can make the rotating force transmission pin 60 swing, but it is preferable not to have the groove from the viewpoint of rotation transmission.

In this manner, according to the bearing member 41, the rotating force transmission pin 60 can be attached and detached from the side on which the shaft member 70 protrudes, and the attachment and detachment can be easily performed. For example, even when the end member 40 is mounted on the photoreceptor drum 35, it is possible to attach and detach the shaft member 70 and the rotating force transmission pin 60 to and from the bearing member 41.

Figure 10A:
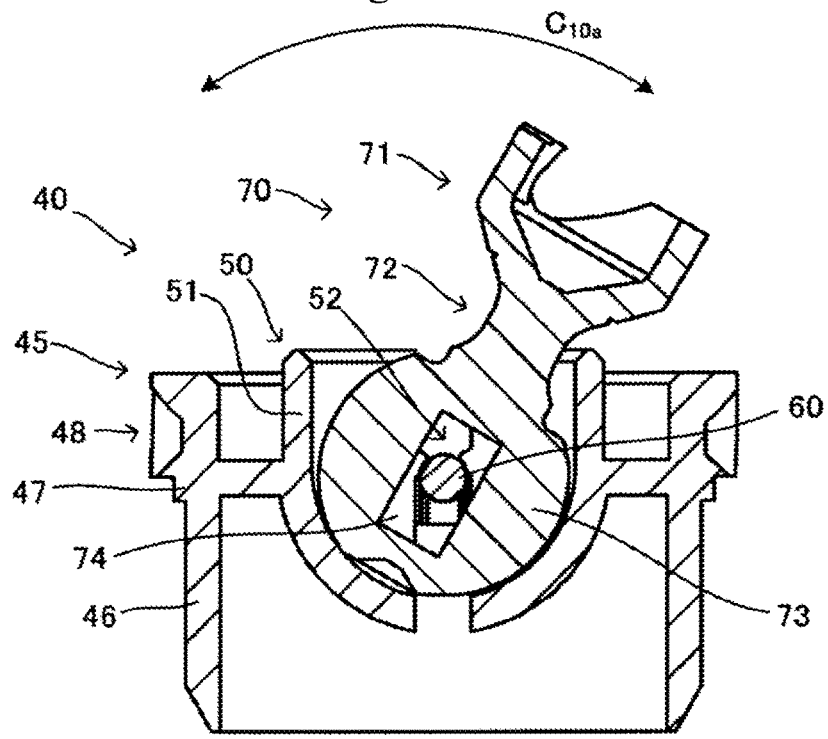
FIG. 10A is a view illustrating an example of a posture in which the shaft member 70 is inclined in one section of the end member 40.
Figure 10B:
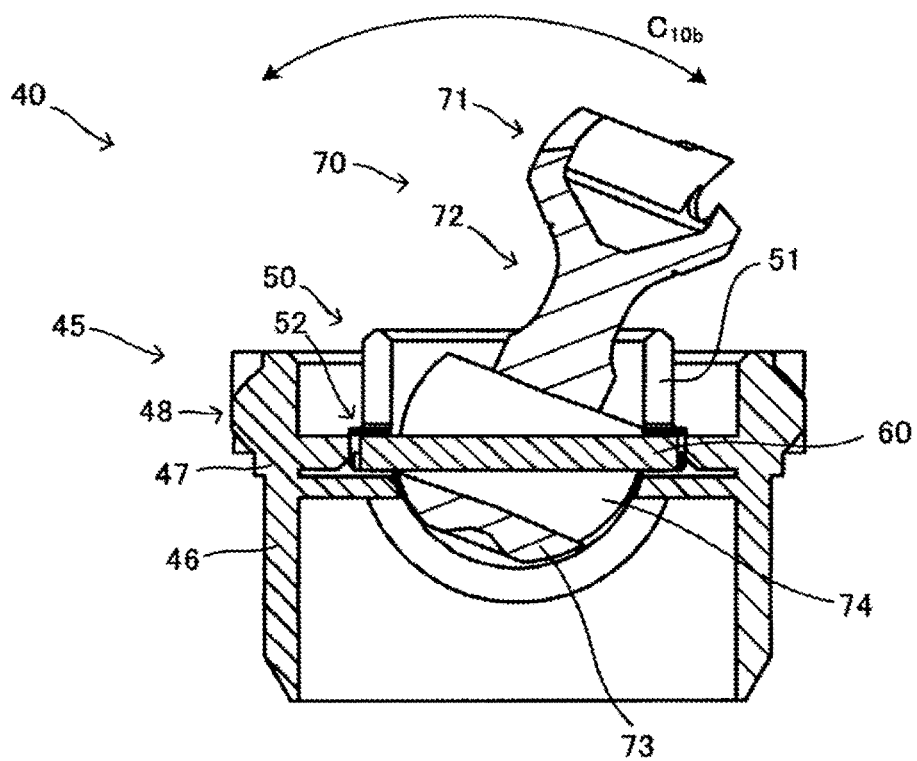
FIG. 10B is a view illustrating an example of the posture in which the shaft member 70 is inclined in another section of the end member 40.

By disposing the shaft member 70 on the inside of the bearing member 41 in this manner, the shaft member 70 can swing as illustrated in FIGS. 10A and 10B. In other words, at the viewpoint illustrated in FIG. 10A, the shaft member 70 can swing around the shaft line of the rotating force transmission pin 95 as indicated by an arrow $C_{10a}$. Meanwhile, as indicated by an arrow $C_{10b}$ at the viewpoint illustrated in FIG. 10B, the shaft member 70 can swing in a range until the rotating force transmission pin 60 comes into contact with the inner wall surface of the hole 74 and is hooked by the shape of the hole 74. The swinging illustrated in FIG. 10A and the swinging illustrated in FIG. 10B are swinging in directions orthogonal to each other.

In addition, when receiving the driving force from the apparatus main body 10, the shaft member 70 receives the rotating force around the shaft line as indicated by an arrow $C_{9a}$ in FIGS. 9A and 9B. At this time, a wall surface of the hole 74 of the shaft member 70 presses the rotating force transmission pin 60, the rotating force transmission pin 60 presses the main body 45, and the rotating force can be transmitted to the photoreceptor drum 35.

In this manner, according to the end member 40, since the swinging of the shaft member 70 does not depend on the swinging of the rotating force transmission pin 60, similar to the above-described NPL 1, the groove (introduction part, introduction groove) for introducing the rotating force transmission pin into a swing groove is not necessarily provided, and the swinging can be smoothly operated.

By the above-described structure, the shaft member 70 is held by the bearing member 41 while rotating (swinging) and transmitting the rotating force.

Figure 11:
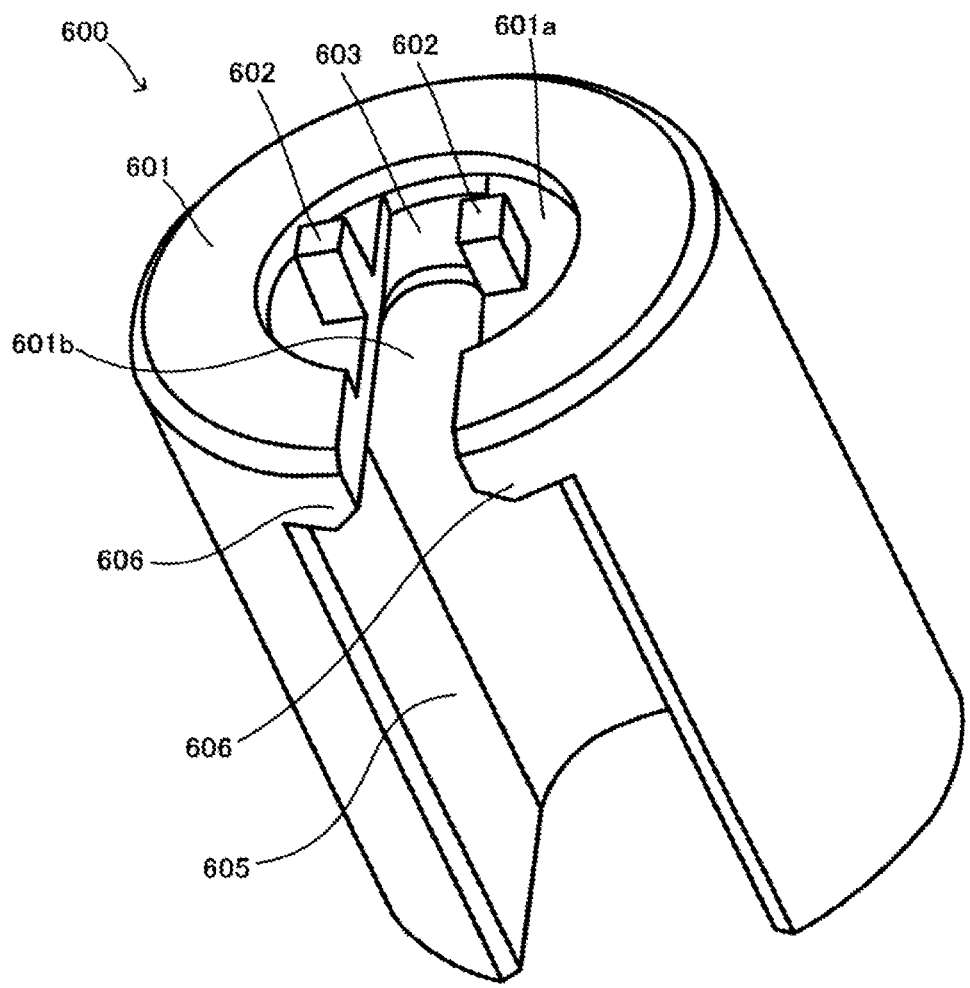
FIG. 11 is an external perspective view of an assembly tool 600.

Assembling of each member of the end member 40 can be performed by using an assembly tool 600, for example, as follows. FIGS. 11 to 15 illustrate views for the description. FIG. 11 is an external perspective view of the assembly tool 600, and FIGS. 12 to 15 illustrate situations in which the end member 40 is assembled by using the assembly tool 600.

The assembly tool 600 is a tubular member having a bottom portion 601 on one side, and a recess 601a is formed on the surface that becomes an outer side thereof so as to be coaxial to the tubular shaft in the bottom portion 601. From the surface of the recess 601a, two projections 602 having an interval so as to protrude to the outside of the tubular shape stand upright. The interval between the two projections 602 is substantially the same as the thickness of the rotating shaft 72 of the shaft member 70.

Furthermore, between the two projections 602 of the bottom portion 601, a slit 601b which communicates with the inside of a tubular shape is provided, and the slit 601b is also configured to open further on the side surface side. Therefore, the slit 601b is configured to be able to enter from the side surface side of the tubular shape. Since the width of this slit 601b is the same as the interval between the two projections 602, the width is substantially the same the thickness of the rotating shaft 72 of the shaft member 70.

In addition, an abutting portion 603 is disposed at an end portion of the slit 601b which is not opened to the side.

Meanwhile, a slit 605 which communicates with the inside is also formed in the tubular side portion of the assembly tool 600. The width (the size in the circumferential direction of the tubular shape) of the slit 605 is set to have such a size by which the coupling member 71 of the shaft member 70 can be inserted.

In addition, the slit 605 communicates with the slit 601b of the bottom portion 601 at the end portions. Since the width of the slit 601b is approximately the thickness of the rotating shaft 72 and the width of the abutting portion 603 has the size by which the coupling member 71 can be inserted, as can be ascertained from FIG. 11, steps 606 are formed in a communication portion between the slit 601b and the slit 605.

Using the assembly tool 600 as described above, for example, each configuration member of the end member 40 is assembled as follows. FIGS. 12 to 15 illustrate views for the description.

Figure 12:
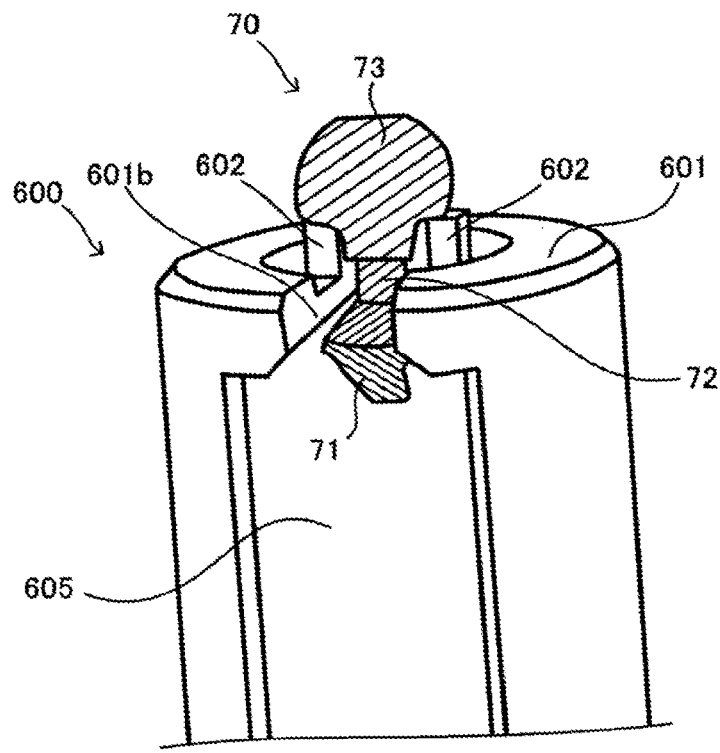
FIG. 12 is a view describing manufacturing of the end member 40 by the assembly tool 600.

First, as illustrated in FIG. 12, the rotating shaft 72 is inserted into the assembly tool 600 so as to pass through the slit 61b such that the coupling member 71 of the shaft member 70 passes through the slit 605. At this time, the spherical body 73, which is a base end portion of the shaft member 70, is disposed so as to be placed on the projection 602 so as to pass the two projections 602. In addition, the abutting portion 603 is provided such that the shaft member 70 is disposed as illustrated in FIG. 12 when the shaft member 70 is pressed against the abutting portion 603.

Here, the slit 601b has a width that is approximately the same as the thickness of the rotating shaft 72, and has a width by which the coupling member 71 and the base end portion (spherical body 73) cannot pass therethrough, the shaft member 70 can take a stable posture illustrated in FIG. 12, and there is no case where the shaft member 70 comes out in the shaft line direction of the cylindrical shape of the assembly tool 600.

Figure 13:
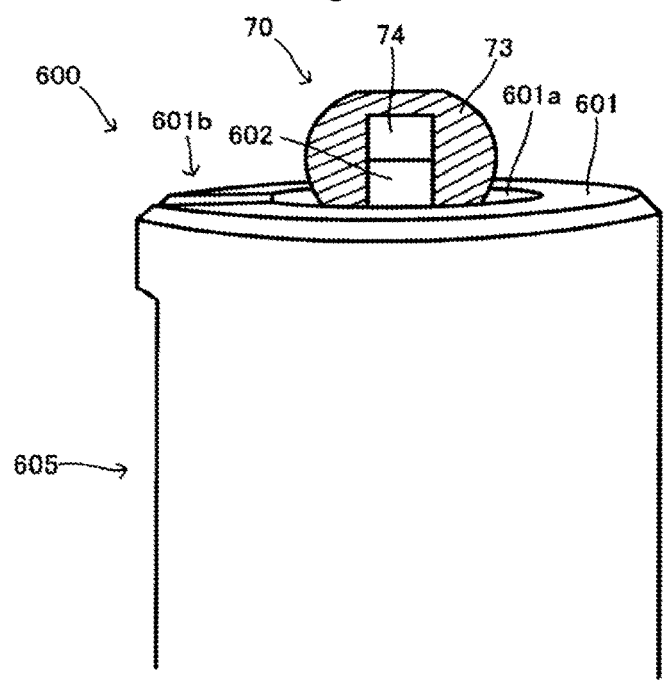
FIG. 13 is a view describing manufacturing of the end member 40 by the assembly tool 600.
Figure 14:
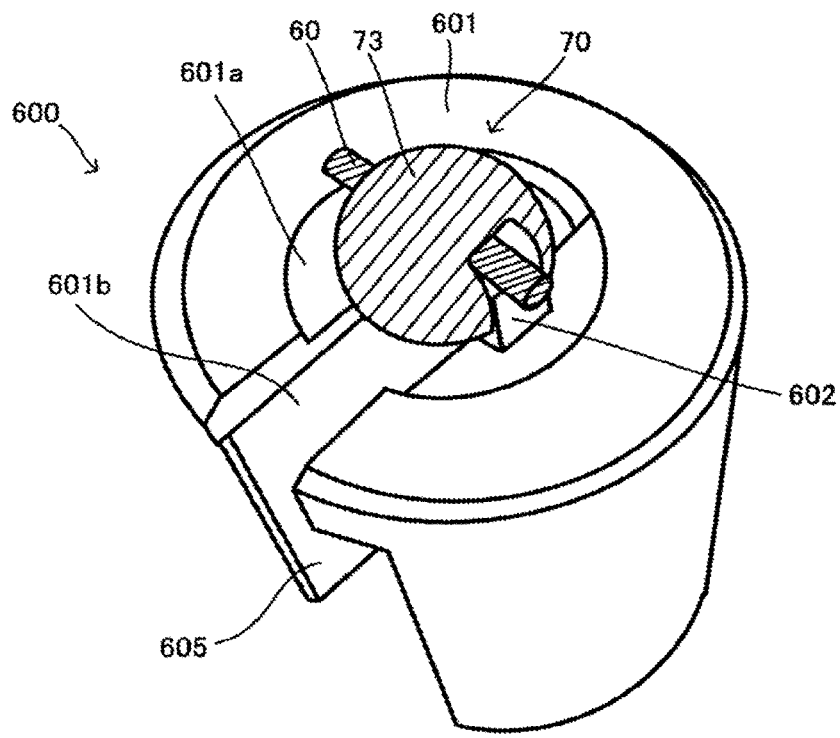
FIG. 14 is a view describing manufacturing of the end member 40 by the assembly tool 600.

FIG. 13 is a view when FIG. 12 is viewed from a different angle, and is a view when viewed from a position at which the hole 74 is seen. As can be ascertained from FIG. 13, from the viewpoint, the hole 74 is disposed above the projection 602. From the state, the rotating force transmission pin 60 is inserted into the hole 74. Then, as illustrated in FIG. 14, while penetrating the hole 74, each of both ends thereof is disposed to be placed on the projection 602 so as to pass the two projections 602. At this time, when necessary, the shaft member 70 may be pressed in the shaft line direction toward the inside of the assembly tool 600. Accordingly, the rotating force transmission pin 60 is disposed more stably being sandwiched between the projection 602 and the wall surface of the hole 74.

Figure 15:
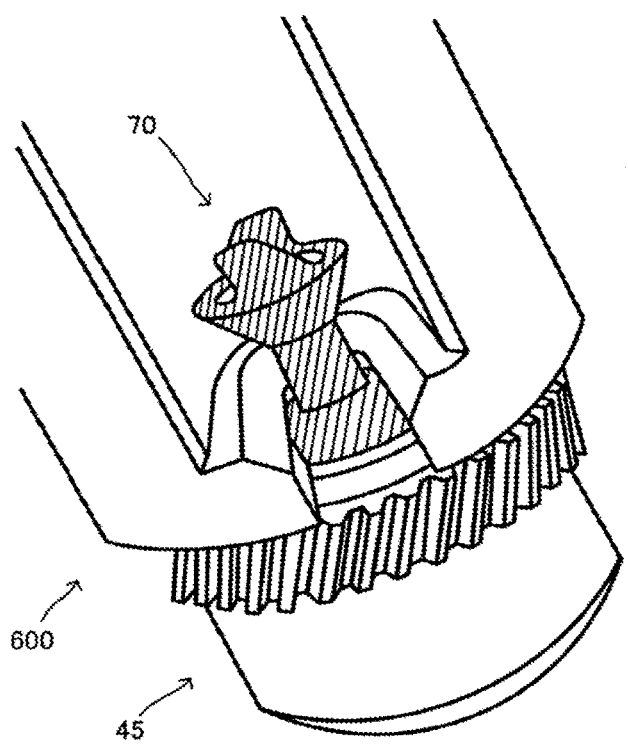
FIG. 15 is a view describing manufacturing of the end member 40 by the assembly tool 600.

In addition, as illustrated in FIG. 15, by inserting the base end portion 73 of the shaft member 70 which protrudes from the bottom portion 601 of the assembly tool 600 and the rotating force transmission pin 60 into the main body of the bearing member 41, it is possible to assemble the end member 40.

In this manner, according to the assembly tool 600, it is possible to efficiently manufacture the end member 40. In addition, not being limited to the end member 40, the invention can also be used in manufacturing any end member including other aspects.

Attachment of the end member 40 to the photoreceptor drum 35 is performed as the end portion on a side on which the shaft member 70 of the end member 40 does not protrude is inserted into the photoreceptor drum 35 after the end member 40 is assembled as illustrated in FIGS. 9A and 9B. By the end member 40, when mounting the process cartridge 20 to the apparatus main body 10, it is possible to appropriately apply a rotating force to the photoreceptor drum 35 and to easily attach and detach the process cartridge 20.

As described above, on the inside of the housing 21 of the process cartridge 20 (refer to FIG. 2), the photoreceptor drum unit 30, the charging roller unit 22, the developing roller unit 23, the regulating member 24, and the cleaning blade 25 are rotatably housed. In other words, each member rotates as necessary on the inside of the housing 21 to exert the function thereof.

In addition, in the aspect, in the shaft members 70 of the photoreceptor drum unit 30, at least the coupling member 71 is disposed to be exposed from the housing 21. Accordingly, as will be described later, it is possible to obtain a rotation driving force from the apparatus main body 10, and to easily attach and detach the apparatus main body 10 and the process cartridge 20.

Here, although each member included in the process cartridge 20 is exemplified, the member included therein is not limited thereto, and it is preferable that other members, parts, developers and the like which are generally provided for the process cartridge are provided.

Next, the apparatus main body 10 will be described. The apparatus main body 10 of the aspect is a laser printer. In the laser printer, the above-described process cartridge 20 operates in a mounted posture, and when the image is formed, the photoreceptor drum 35 is rotated, and charging is performed by the charging roller unit. In this state, the photoreceptor drum 35 is irradiated with the laser light which corresponds to image information by using various optical members provided here, and the electrostatic latent image which is based on the image information is obtained. The latent image is developed by the developing roller unit 23.

Meanwhile, the recording medium, such as a paper sheet, is set in the apparatus main body 10, and is conveyed to a transfer position by a sending roller or a conveying roller, which is provided in the apparatus main body 10. A transfer roller 10a (refer to FIG. 2) is disposed at the transfer position, voltage is applied to the transfer roller 10a following the passage of the recording medium, and the image is transferred to the recording medium from the photoreceptor drum 35. After this, the image is fixed to the recording medium as heat and pressure are applied to the recording medium. In addition, the recording medium on which the image from the apparatus main body 10 is formed is discharged by a discharge roller.

In this manner, in a posture in which the process cartridge 20 is mounted, the apparatus main body 10 applies the rotation driving force to the photoreceptor drum unit 30. Here, how the rotation driving force is applied to the photoreceptor drum unit 30 from the apparatus main body 10 in a posture in which the process cartridge 20 is mounted, will be described.

Figure 16A:
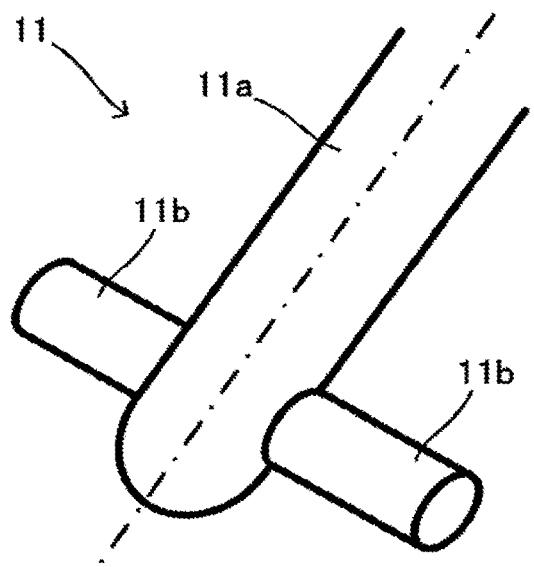
FIG. 16A is a perspective view illustrating a driving shaft 11 of an image forming apparatus main body.

The rotation driving force to the process cartridge 20 is applied by the driving shaft 11 which serves as a rotating force applying portion of the apparatus main body 10. FIG. 16A illustrates a shape of a tip end portion of the driving shaft 11. As can be ascertained from FIG. 16A, the driving shaft 11 includes a shaft portion 11a which is a columnar shaft member of which a tip end is a hemispherical surface, and a columnar pin 11b which serves as a rotating force applying portion that protrudes in the direction orthogonal to the rotating shaft line indicated by one-dot chain line of the shaft portion 11a. On the side opposite to the tip end side illustrated in FIG. 16A of the driving shaft 11, a gear train is formed to make the rotation around the shaft line of the shaft portion 11a of the driving shaft 11 possible, and is connected to a motor which is a driving source via the gear train.

In addition, the end portion of the driving shaft 11 is disposed to protrude on a trajectory of the attachment and detachment movement at a substantially right angle with respect to the moving direction for attaching and detaching the process cartridge 20 illustrated in FIG. 1 to and from the apparatus main body 10. Therefore, when attaching and detaching the process cartridge 20, it is necessary to mount and disengage the shaft member 70 to and from the driving shaft 11 as described above. In addition, according to the above-described end member 40, attachment and detachment between the shaft member 70 and the driving shaft 11 becomes easy. A specific aspect of attachment and detachment will be described later.

Figure 16B:
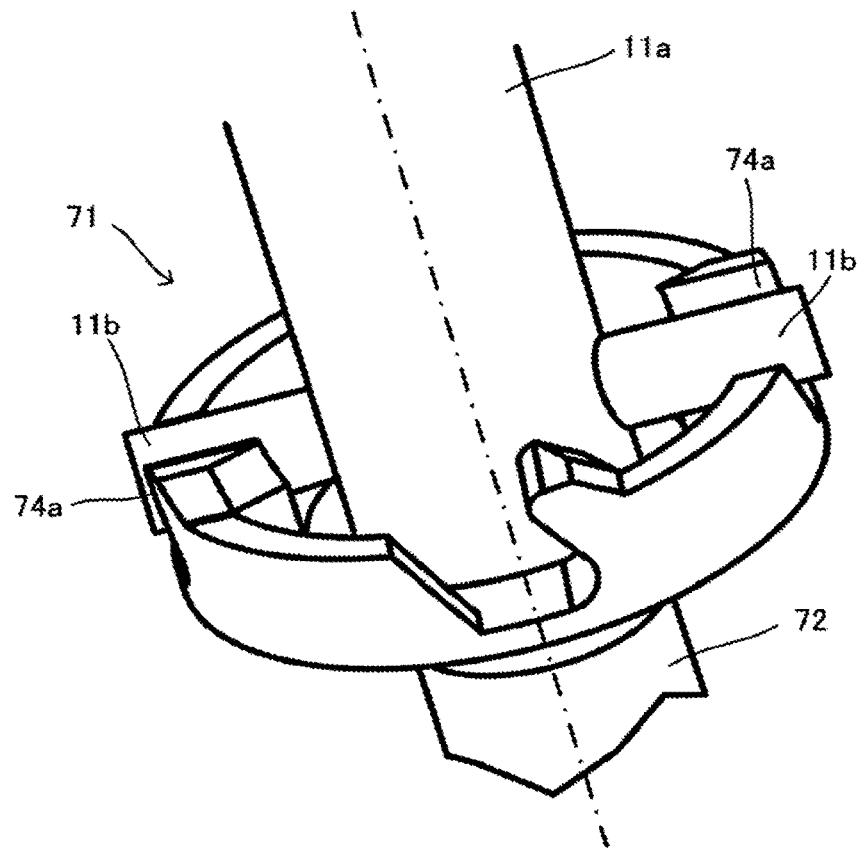
FIG. 16B is a view for describing a posture in which the driving shaft 11 is linked to a coupling member 71.

In the posture in which the process cartridge 20 is mounted on the apparatus main body 10, the driving shaft 11 and the coupling member 71 of the shaft member 70 of the end member 40 are engaged with each other, and the rotating force is transmitted. FIG. 16B illustrates a situation in which the coupling member 71 of the end member 40 is engaged with the driving shaft 11. As can be ascertained from FIG. 16B, in such a posture in which the driving shaft 11 and the coupling member 71 are engaged with each other, the driving shaft 11 and the coupling member 71 are disposed to abut against each other such that the shaft line of the shaft portion 11a of the driving shaft 11 and the shaft line of the coupling member 71 match each other. At this time, as illustrated in FIG. 16B, the pin 11b of the driving shaft 11 is disposed in a groove 74a which opposes the coupling member 71. Accordingly, the coupling member 71 rotates following the rotation of the driving shaft 11, and the photoreceptor drum unit 30 rotates.

Above, the posture in which the rotating force is transmitted is a posture in which the shaft line of the shaft portion 11a and the shaft line of the coupling member 71 are disposed coaxially to each other and the pin 11b is engaged with the groove 74a of the coupling member 71.

Figure 17A:
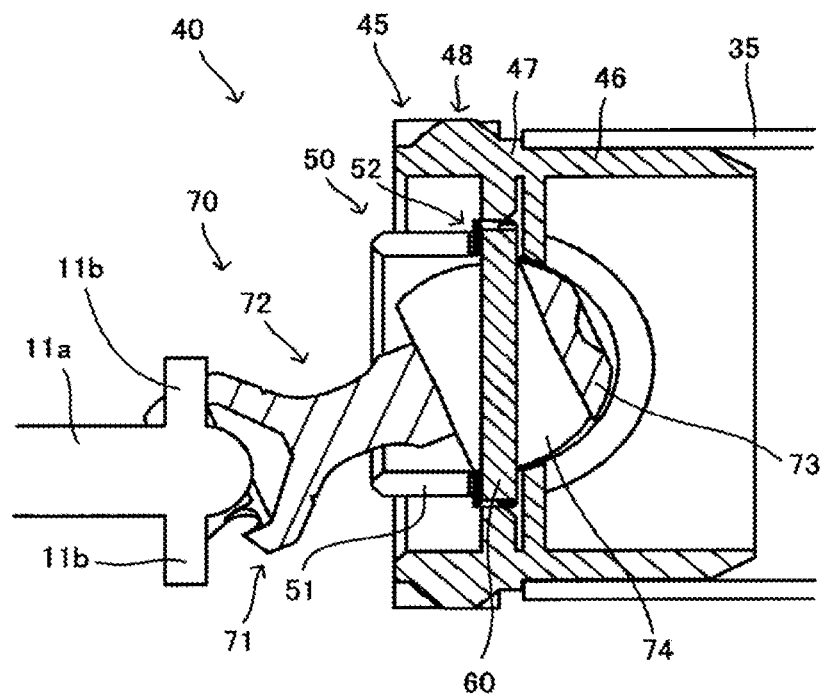
FIG. 17A is a view for describing one situation in which the process cartridge is mounted on the apparatus main body.
Figure 17B:
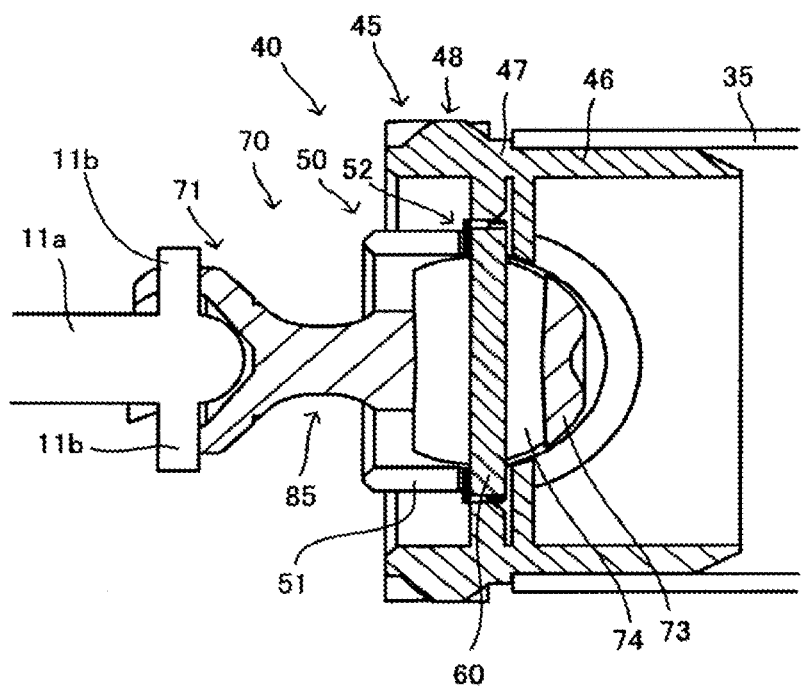
FIG. 17B is a view for describing another situation in which the process cartridge is mounted on the apparatus main body.

Next, an example in which the operation of the driving shaft 11 and photoreceptor drum unit 30 when mounting the process cartridge 20 on the apparatus main body 10 will be described. FIG. 17 illustrates a view for the description. FIG. 17A is a view illustrating one situation in which the end member 40 is engaged with the driving shaft 11, and FIG. 17B is a view illustrating another situation in which the end member 40 is engaged with the driving shaft 11. In FIG. 17, the order of the operation is illustrated in FIGS. 17A and 17B, and the left and right sides of the paper surface are directions in which the shaft line extends. In addition, this is a situation in which the process cartridge 20 is mounted to be moved downward in the paper surface.

First, as illustrated in FIG. 17A, the coupling member 71 of the shaft member 70 has a posture of being inclined toward the driving shaft 11 side. It is preferable that the posture of the shaft member 70 is the most inclined position. When the process cartridge 20 is moved downward on the paper surface from this posture, the tip end of the driving shaft 11 is in contact state to be hooked to the wall portion that stands upright from the inside of the bottom portion or the bottom of the coupling member 71. When the process cartridge 20 is further pushed into the apparatus main body 10, the driving shaft 11 which is in contact state to be hooked to the coupling member 71 so as to be hooked rotates (swings) such that the shaft member 70 inclined with respect to the shaft line direction approaches the shaft line direction. In addition, the pin 11b is engaged with the groove 74a (refer to FIG. 16 B) provided in the coupling member.

In addition, by further pushing the process cartridge 20 in the mounting direction, as illustrated in FIG. 17B, a posture illustrated in FIG. 17B in which the shaft line of the inclined shaft member 70 matches with the shaft line of the driving shaft 11, and the shaft lines of the driving shaft 11, the shaft member 70, the bearing member 41, and the photoreceptor drum 35 match each other, is achieved. Accordingly, the rotating force is appropriately applied from the driving shaft 11 to the shaft member 70, the bearing member 41, and the photoreceptor drum 35, and finally the rotating force is applied to the process cartridge 20.

Meanwhile, the operation of the driving shaft 11 and the photoreceptor drum unit 30 when disengaging the process cartridge 20 from the apparatus main body 10 may be traced back to the above-described order.

As described above, the process cartridge 20 can be disengaged from the apparatus main body 10 so as to be pulled out in a direction different from the shaft line direction of the driving shaft 11 of the apparatus main body 10, and can be mounted on the apparatus main body 10 so as to be pushed in.

Figure 18A:
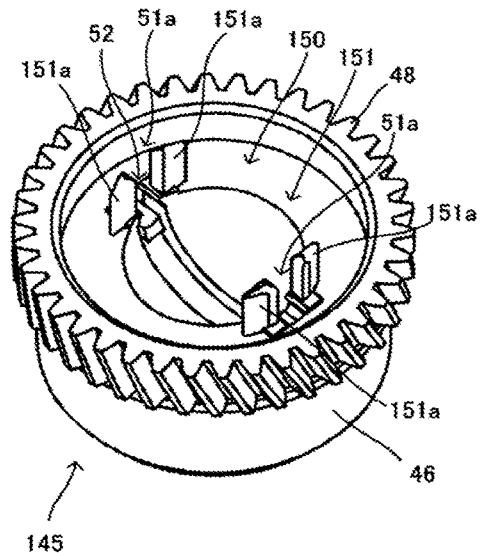
FIG. 18A is a perspective view of a main body 145 of the bearing member 141.
Figure 18B:
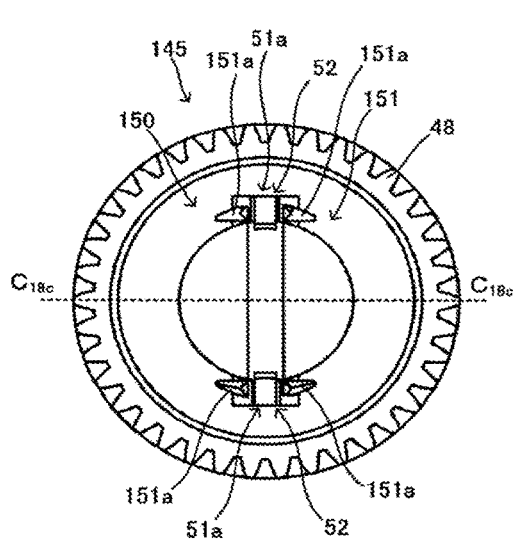
FIG. 18B is a plan view of the main body 145 of the bearing member 141.
Figure 18C:
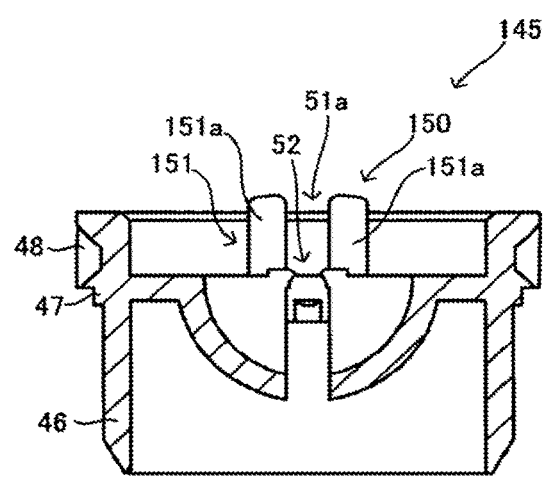
FIG. 18C is a sectional view of the main body 145 of the bearing member 141.

FIG. 18 is a view for describing a second aspect. FIG. 18A is a perspective view of the main body 145 of the bearing member 141, FIG. 18B is a plan view of the main body 145 viewed from the side on which the shaft member 70 is inserted, and FIG. 18C is a sectional view along the line indicated by $C_{18c}$-$C_{18c}$ in FIG. 18B. In the second embodiment, the aspect of a holding portion 150 of the bearing member 141 is different only from the holding portion 50 of the bearing member 41 described above, and the other members are the same as the above-described end member 40. Here, the common members will be given the same reference numerals, and the description thereof will be omitted, and the holding portion 150 will be described.

In the aspect, the holding portion 150 is provided on the tubular inside of the tubular body 46. The holding portion 150 is a part which holds the rotating force transmission pin 60 and encloses the base end portion side of a shaft member 70 (to be described later) on the inside thereof. The holding portion 150 is provided with a shaft member accommodation portion 151 and the pin holding portion 52. Since the pin holding portion 52 is the same as the bearing member 41, the description thereof will be omitted here.

The shaft member accommodation portion 151 is a member which accommodates the base end portion side of the shaft member 70 on the inside thereof, and forms the pin holding portion 52. In the aspect, the shaft member accommodation portion 151 does not have a tubular shape, and the above-described groove 51a is formed by providing two plate members 151a which stand upright with an interval. In addition, the plate material 151a is also formed on the opposite side across the shaft line of the tubular body 46.

The bearing member 141 having the holding portion 150 can also act similar to the above-described bearing member 41.

Figure 19A:
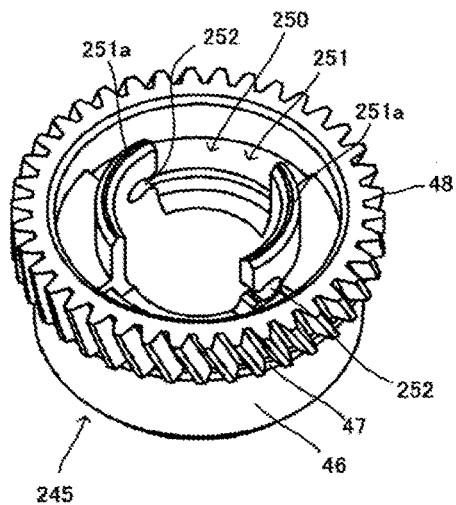
FIG. 19A is a perspective view of a main body 245 of a bearing member 241.
Figure 19B:
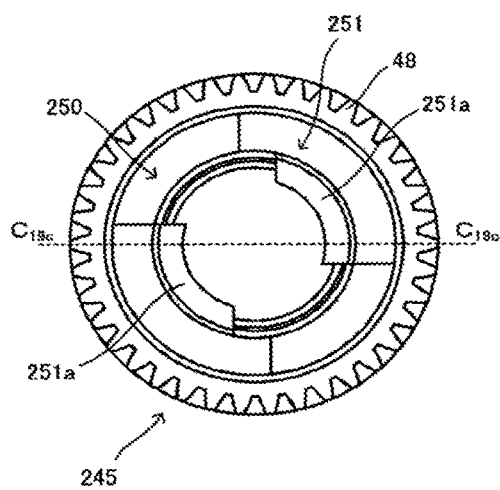
FIG. 19B is a plan view of the main body 245 of the bearing member 241.
Figure 19C:
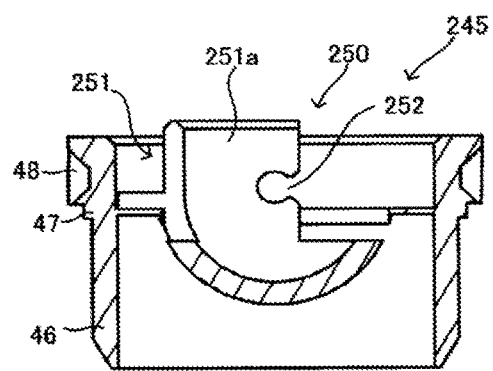
FIG. 19C is a sectional view of the main body 245 of the bearing member 241.

FIG. 19 is a view for describing a third aspect. FIG. 19A is a perspective view of a main body 245 of a bearing member 241, FIG. 19B is a plan view of the main body 245 viewed from the side on which the shaft member 70 is inserted, and FIG. 19C is a sectional view along the line indicated by $C_{19c}$-$C_{19c}$ in FIG. 19B. In the third embodiment, the aspect of a holding portion 250 of the bearing member 241 is different only from the holding portion 50 of the bearing member 41 described above, and the other members are the same as the above-described end member 40. Here, the common members will be given the same reference numerals, and the description thereof will be omitted, and the holding portion 250 will be described.

The holding portion 250 is a part which holds the rotating force transmission pin 60 and encloses the base end portion side of a shaft member 70 on the inside thereof. The holding portion 250 is provided with a shaft member accommodation portion 251 and the pin holding portion 252.

The shaft member accommodation portion 251 is a member which accommodates the end portion on the base end portion side of the shaft member 70 on the inside thereof, and forms the pin holding portion 252. In the aspect, the shaft member accommodation portion 251 has a plate member 251a which stands upright in the same direction as the shaft line of the tubular body 46. In addition, two plate members 251a are provided so as to oppose each other across the shaft line of the tubular body 46.

The pin holding portion 252 is a part which is formed in the shaft member accommodation portion 251, holds one end and the other end of the rotating force transmission pin 60, and accordingly, holds the rotating force transmission pin 60 to the main body 245.

As can be ascertained from FIGS. 19A and 19C, the pin holding portion 252 of the aspect has an opening which faces in the circumferential direction so as to insert the rotating force transmission pin 60 from the circumferential direction, and it is possible to hold the rotating force transmission pin while being attachable and detachable by the snap-fit structure.

The bearing member 241 having the holding portion 250 can also act similar to the above-described bearing member 41.

Figure 20:
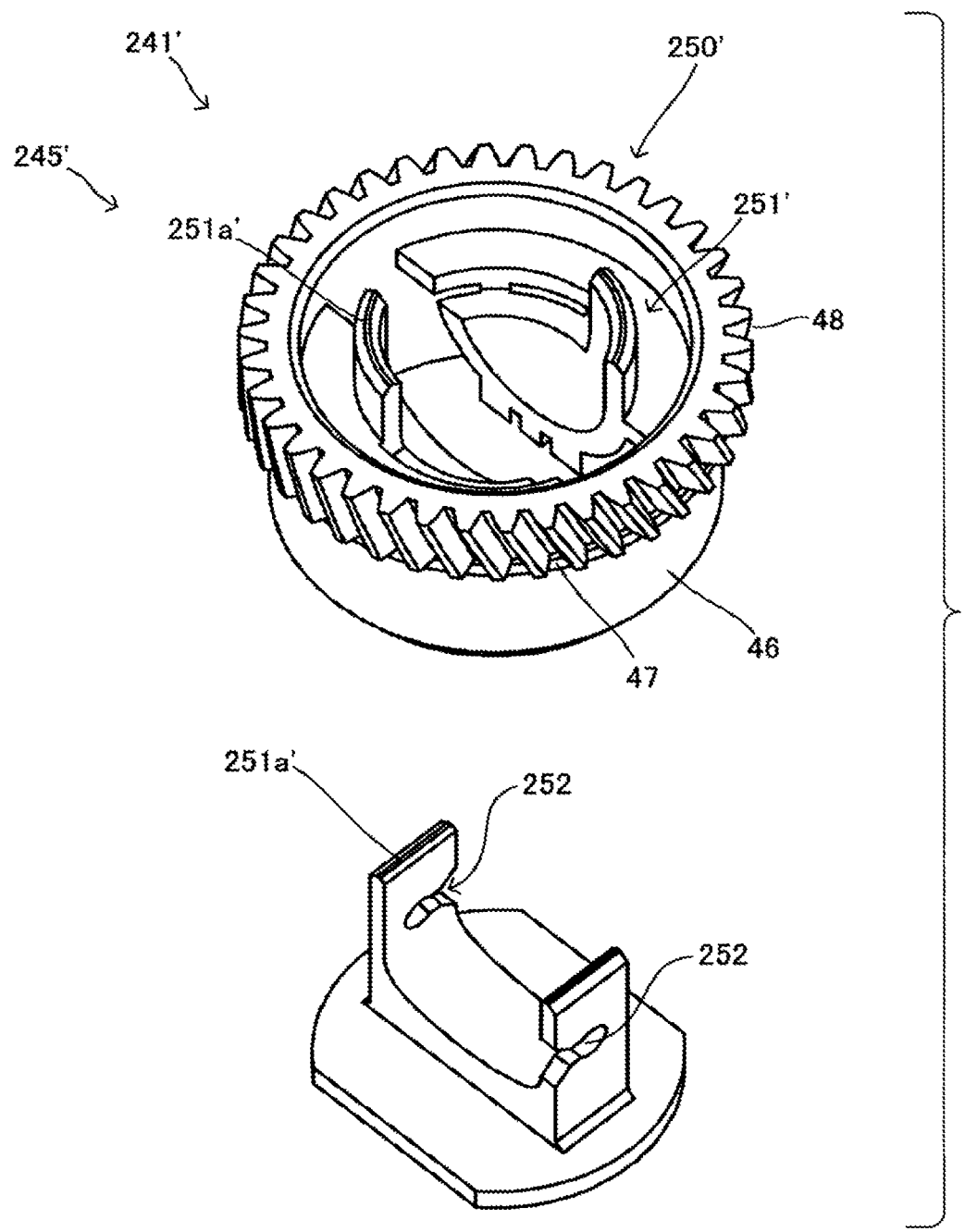
FIG. 20 is an exploded perspective view of a main body 245' of a bearing member 241'.

FIG. 20 illustrates an exploded perspective view of a bearing member 241' which is a modification example of the bearing member 241. As can be ascertained from FIG. 20, the bearing member 241' configures a part including the pin holding portion 252 as a separate member, in the bearing member 241 described above. By combining these, the same aspect as the bearing member 241 can be obtained.

Figure 21:
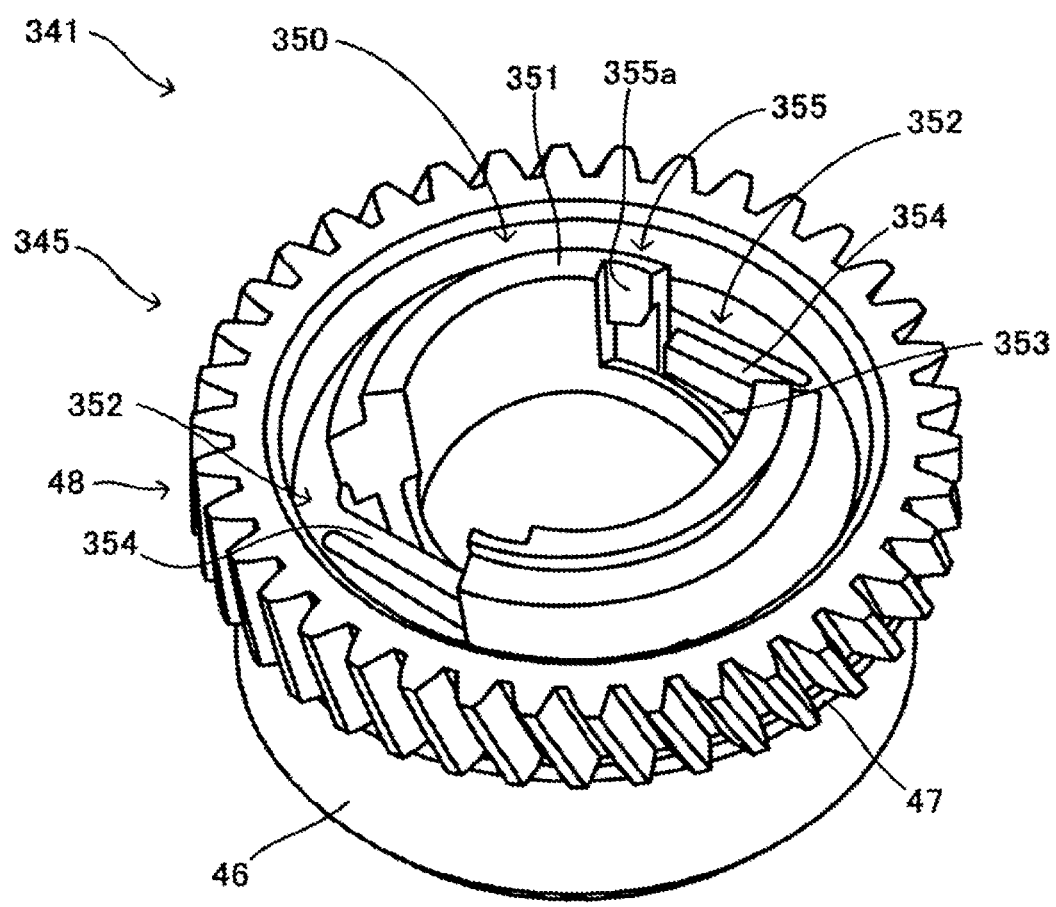
FIG. 21 is a perspective view of a bearing member 341.
Figure 22A:
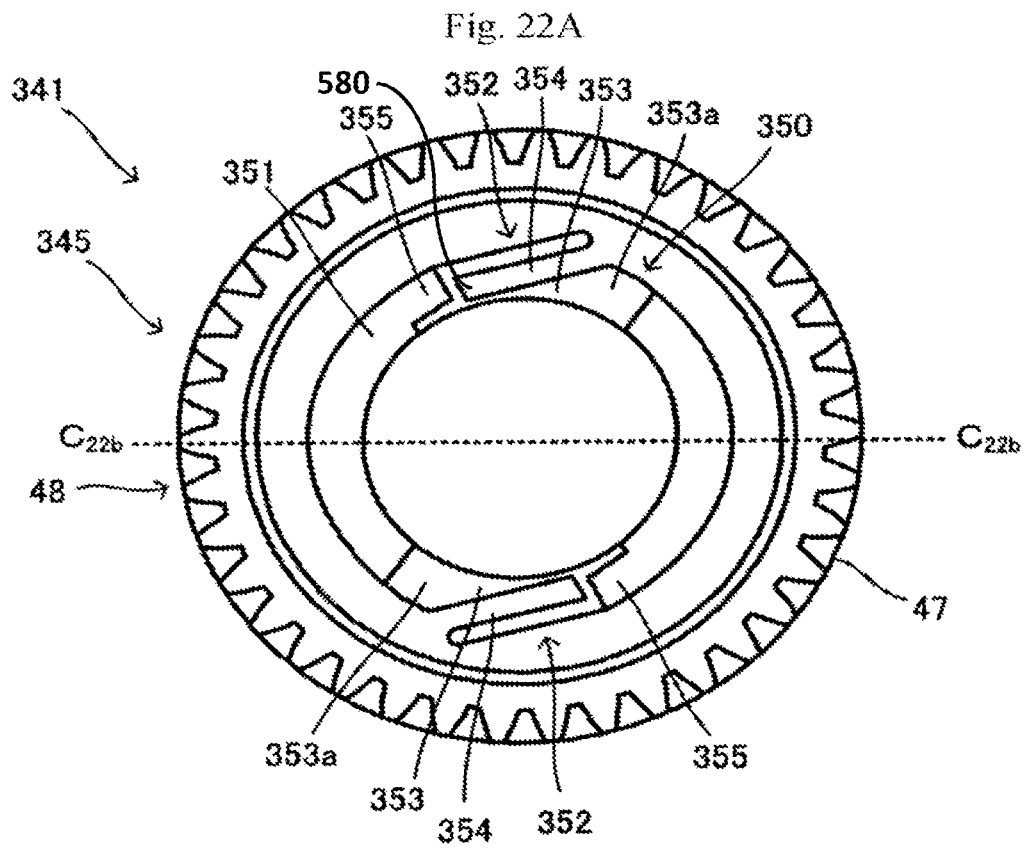
FIG. 22A is a plan view of a main body 345 of the bearing member 341.
Figure 22B:
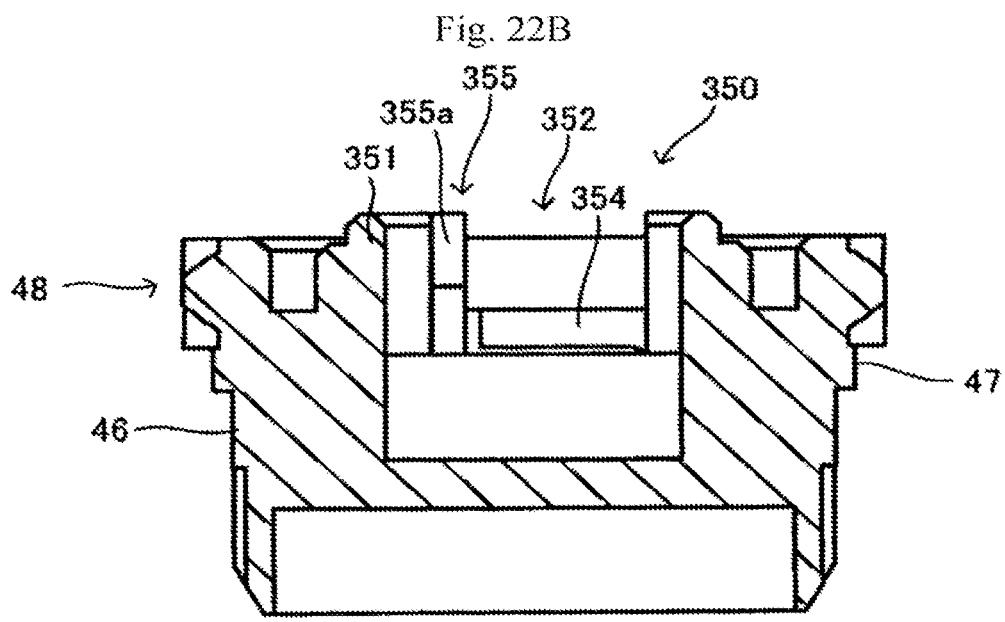
FIG. 22B is a sectional view of the main body 345 of the bearing member 341.

FIGS. 21 and 22 illustrate views for describing a fourth aspect. FIG. 21 is a perspective view of the main body 345 of the bearing member 341, FIG. 22A is a plan view of the main body 345 when viewed from the side on which the shaft member 70 is inserted, and FIG. 22B is a sectional view along the line indicated by $C_{22b}$-$C_{22b}$ in FIG. 22A. In the fourth embodiment, the aspect of a holding portion 350 of the bearing member 341 is different only from the holding portion 50 of the bearing member 41 described above, and the other members are the same as the above-described end member 40. Here, the common members will be given the same reference numerals, and the description thereof will be omitted, and the holding portion 350 will be described.

The holding portion 350 is a part which holds the rotating force transmission pin 60 and encloses the end portion on the base end portion side of the shaft member 70 on the inside thereof. The holding portion 350 is provided with a shaft member accommodation portion 351 and the pin holding portion 352.

The shaft member accommodation portion 351 is a member which accommodates the end portion on the base end portion side of the shaft member 70 on the inside thereof, and forms the pin holding portion 352. In the aspect, the shaft member accommodation portions 351 are protruding portions which oppose each other across the shaft line of the tubular body 46.

Two pin holding portions 352 are formed between adjacent shaft member accommodation portions 351 and are provided so as to oppose each other across a shaft line. Accordingly, the pin holding portion 352 holds one end and the other end of the rotating force transmission pin 60, and holds the rotating force transmission pin 60 to the main body 345.

The pin holding portion 352 of the aspect has an introduction portion (introduction groove) 353, a regulating member 354, a groove 580, and an engaging portion 355.

The introduction portion 353 is a space formed such that the end portion of the rotating force transmission pin 60 can move in the circumferential direction of the tubular body 46, and is a part formed by a groove or a notch having a shape of an internal corner.

The regulating member 354 is an elastic member subject to flexing due to a biasing force in the radial direction of the tubular body 46, and is disposed in the introduction portion 353. In the aspect, the regulating member 354 is configured to be capable of integrally biasing with the same member as the tubular body 46. The biasing force is applied to the regulating member 354 via the rotating force transmission pin 60, and the groove 580 enables the regulating member 354 to flex due to a space created by the groove 580 adjacent to the regulating member 354 in the radial direction. In addition to this, the regulating member may be configured by attaching a member having a biasing force, such as a plate spring or rubber.

The disposition of the projection-like regulating member 354 on the introduction portion 353 is set to be on the trajectory on which the rotating force transmission pin 60 moves, and an end portion 353a in which the projection-like regulating member 354 is not disposed exists in the introduction portion 353. In addition, at least the end portion 353a is opened such that the end portion of the rotating force transmission pin 60 can be inserted from the outside into the shaft line direction of the tubular body 46. In addition, the interval between the opposing projection-like regulating members 354 is provided so as to become narrower from the end portion 353a toward the circumferential direction of the tubular body 46.

The engaging portion 355 is a part provided on the side opposite to the end portion 353a in the end portion of the introduction portion 353 and is a part to be engaged such that the end portion of the rotating force transmission pin 60 does not come out in the shaft line direction of the tubular body 46. In the aspect, a projection 355a which protrudes in the radial direction of the tubular body 46 causes the end portion of the rotating force transmission pin 60 to be hooked here, and the rotating force transmission pin 60 is held without coming out in the shaft line direction of the tubular body 46.

The two pin holding portions 352 are provided so as to oppose each other across the shaft line of the tubular body 46.

Figure 23A:
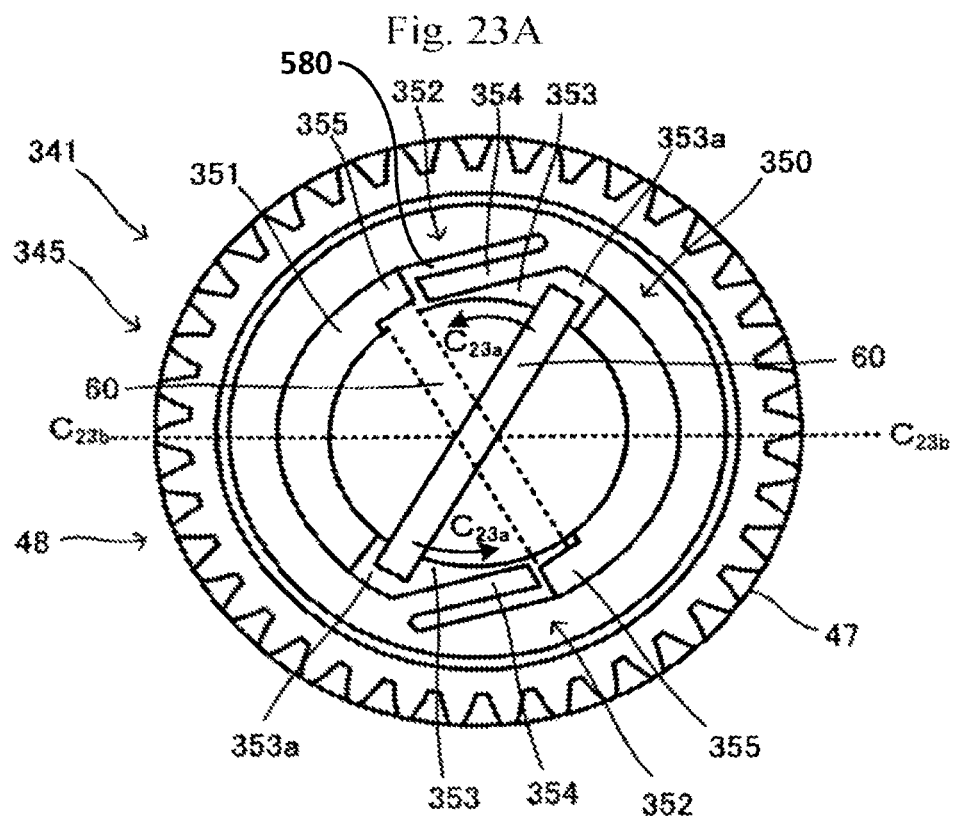
FIG. 23A is a plan view describing a situation in which a rotating force transmission pin 60 is mounted on the main body 345 of a bearing member 341.
Figure 23B:
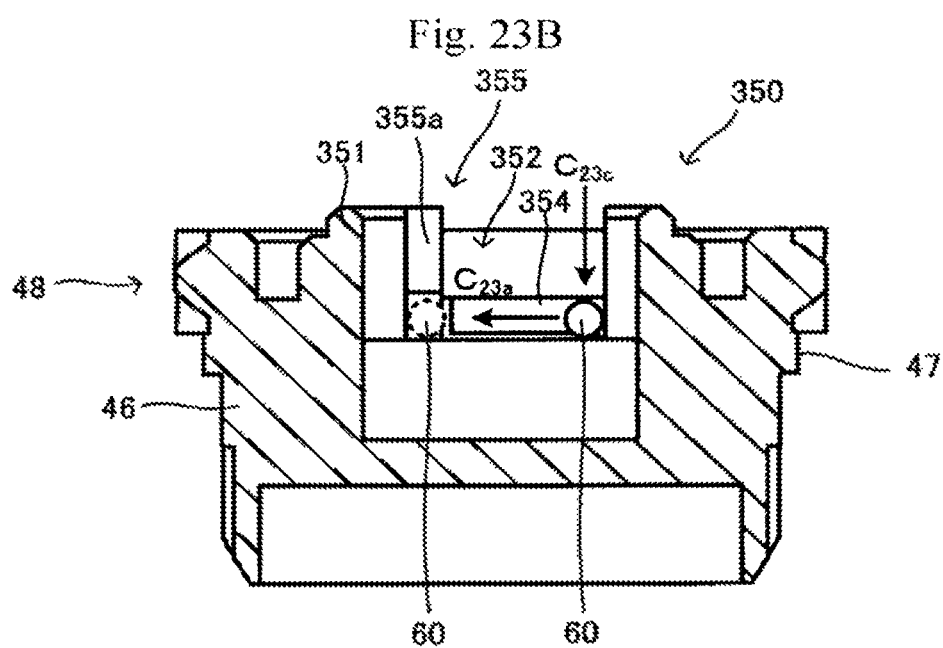
FIG. 23B is a sectional view illustrating a situation in which the rotating force transmission pin 60 is mounted on the main body 345 of the bearing member 341.

FIG. 23 is a view for describing a situation where the rotating force transmission pin 60 is mounted on the pin holding portion 352 together with the shaft member 70. FIG. 23A is a view from the same viewpoint as that of FIG. 22A, and FIG. 23B is a $C_{23b}$-$C_{23b}$ sectional view of FIG. 23A. In order to make it easy to understand, only the rotating force transmission pin 60 is illustrated here, and the shaft member 70 is omitted. The relationship between the shaft member 70 and the rotating force transmission pin 60 is as described above.

In addition, according to the description, the aspect in which the pin holding portion 352 should be provided can further be understood.

Together with the end portion on the base end portion side of the shaft member 70, the rotating force transmission pin 60 is inserted into the shaft member accommodation portion 351. At this time, as illustrated by an arrow $C_{23c}$ in FIG. 23B, the end portion of the rotating force transmission pin 60 is inserted from the shaft line direction of the tubular body 46 so as to be disposed in the end portion 353a of the introduction portion 353. As described above, the end portion 353a is opened such that the insertion is possible. Accordingly, similar to the rotating force transmission pin 60 illustrated by a solid line in FIGS. 23A and 23B, on end of the rotating force transmission pin 60 is disposed in the end portion 353a formed in the introduction portion 353 of one pin holding portion 352, and the other end of the rotating force transmission pin 60 is disposed in the end portion 353a formed in the introduction portion 353 of the other pin holding portion 352.

From the posture, the rotating force transmission pin 60 (the shaft member 70) is rotated around the shaft line of the tubular body 46 and the tubular body 46 is rotated as illustrated by an arrow $C_{23a}$ in FIGS. 23A and 23B. Accordingly, the rotating force transmission pin 60 moves in the introduction portion 353 in the circumferential direction of the tubular body 46. At this time, since the rotating force transmission pin 60 applies the biasing force to the regulating member 354, the regulating member 354 elastically deforms radially outward of the tubular body 46 so as to be pushed into the adjacent groove 580, and the rotating force transmission pin 60 advances while receiving the biasing force from the regulating member 354.

Furthermore, by rotating the rotating force transmission pin 60 (shaft member 70), similar to the rotating force transmission pin 60 illustrated by a dotted line in FIGS. 23A and 23B, the rotating force transmission pin 60 reaches the engaging portion 355 disposed on the other end side in the circumferential direction of the introduction portion 353. At this time, the end portion of the rotating force transmission pin 60 does not receive the biasing force from the projection-like regulating member 354, and no load is applied to the projection-like regulating member 354, and thus, the projection-like regulating member 354 moves radially inward of the tubular body 46, and a state illustrated in FIG. 23A, that is, a posture in which the introduction portion 353 is disposed on the trajectory on which the rotating force transmission pin 60 moves, is recovered.

According to the rotating force transmission pin 60 disposed in this manner, since the end portion of the rotating force transmission pin 60 is disposed in the engaging portion 355, the end portion is hooked to the projection 355a, and thus, there is no case where the rotating force transmission pin 60 and the shaft member 70 comes out in the shaft line direction of the tubular body 46. In addition, in the rotational direction around the shaft line of the tubular body 46, the rotating force transmitted from the shaft member 70 to the rotating force transmission pin 60 to be hooked to the pin holding portion 352 and the projection-like regulating member 354 can be appropriately transmitted to a bearing member 541.

As can be ascertained from above, the bearing member 341 having the holding portion 350 can also act similar to the above-described bearing member 41.

Figure 24A:
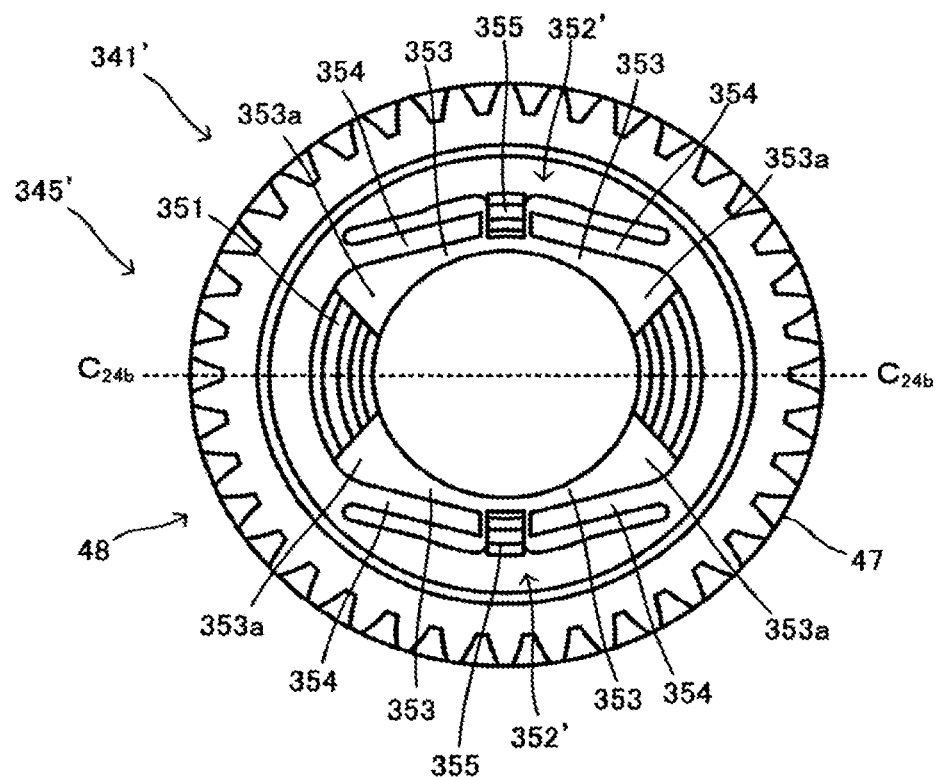
FIG. 24A is a plan view of a main body 345' of a bearing member 341'.
Figure 24B:
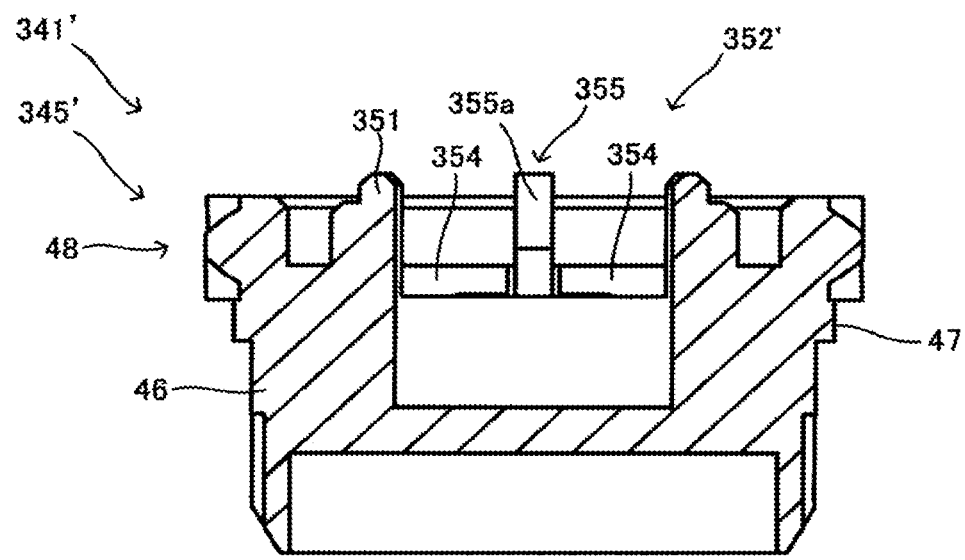
FIG. 24B is a sectional view of the main body 345' of the bearing member 341'.
Figure 25A:
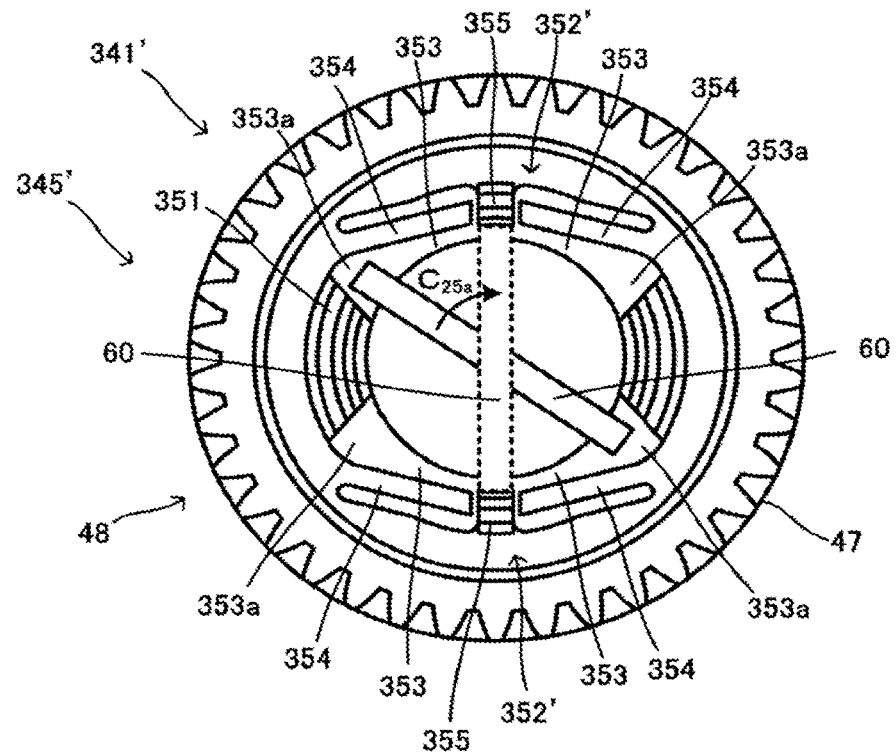
FIG. 25A is a plan view describing a situation in which the rotating force transmission pin 60 is mounted on the main body 345' of the bearing member 341'.
Figure 25B:
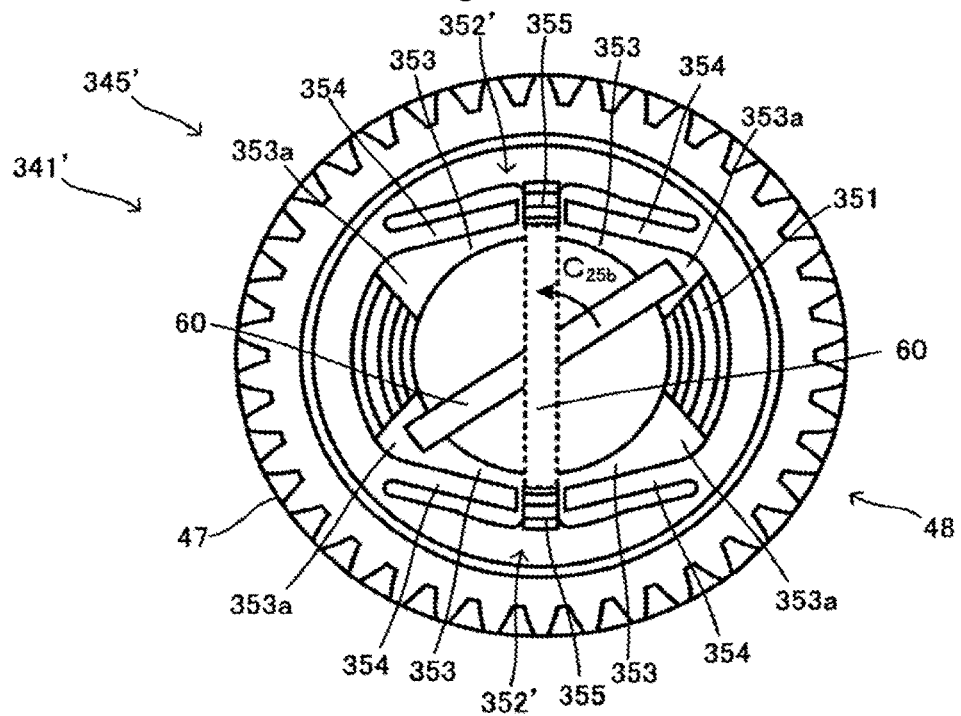
FIG. 25B is a plan view describing another situation in which the rotating force transmission pin 60 is mounted on the main body 345' of the bearing member 341'.

FIGS. 24 and 25 illustrate exploded perspective views of a bearing member 341' which is a modification example of the bearing member 341. FIG. 24A is a view that corresponds to FIG. 22A, and FIG. 24B is a $C_{24b}$-$C_{24b}$ sectional view of FIG. 24A. FIGS. 25A and 25B are views that correspond to FIG. 23A.

As can be ascertained from FIGS. 23 and 24, in the bearing member 341', a pin holding portion 352' is applied instead of the pin holding portion 352 of the bearing member 341.

In addition, in the pin holding portion 352', the introduction portion 353 and the projection-like regulating member 354 are provided on both sides in the circumferential direction of the tubular body 46 across one engaging portion 355. According to this, as can be ascertained from FIGS. 25A and 25B, it is also possible to insert the rotating force transmission pin 60 from the introduction portion 353 from either side, and as illustrated in FIG. 25A, mounting is possible by turning the rotating force transmission pin 60 in the direction of the arrow $C_{25a}$ around the shaft line of the tubular body 46 (circumferential direction of the tubular body 46), and as illustrated in FIG. 25B, the mounting is also possible by turning the rotating force transmission pin 60 in an arrow $C_{25b}$ direction which is a direction opposite thereto.

Figure 26:
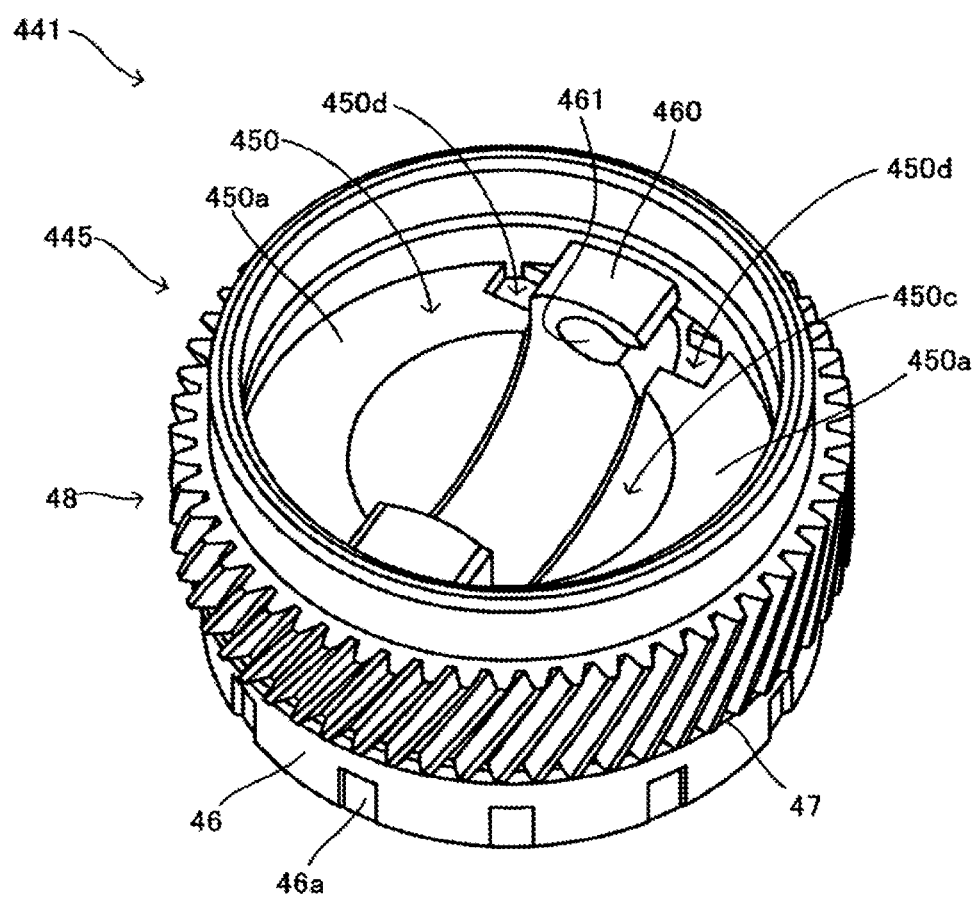
FIG. 26 is a perspective view of a bearing member 441.

FIG. 26 illustrates a view for describing a fifth aspect. FIG. 26 is a perspective view of a bearing member 441. In the aspect, since the bearing members 441 are the same as each of the above-described aspects except for the bearing member 441, the bearing member 441 will be described here. As can be ascertained from FIG. 26, the bearing member 441 has a main body 445 and an intermediate member 460. The intermediate member 460 will be described first.

Figure 27A:
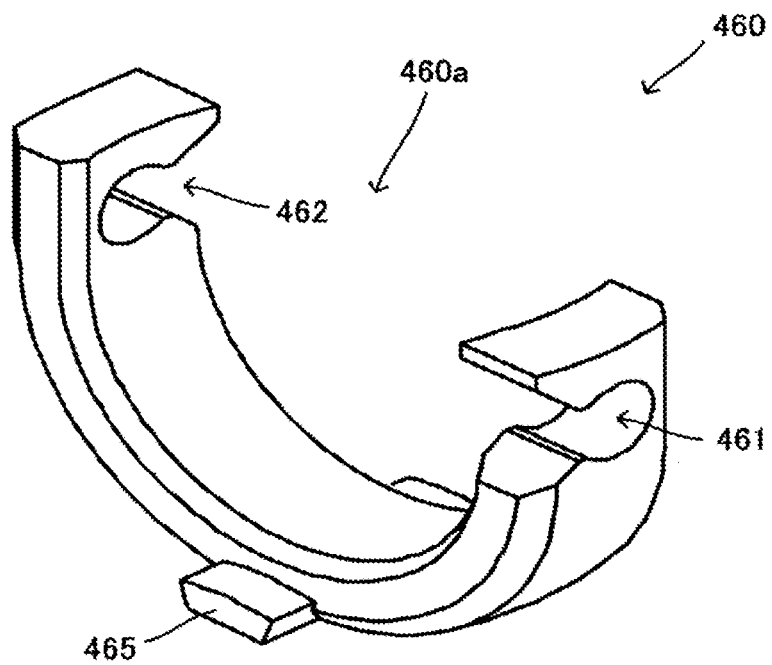
FIG. 27A is a perspective view of an intermediate member 460.
Figure 27B:
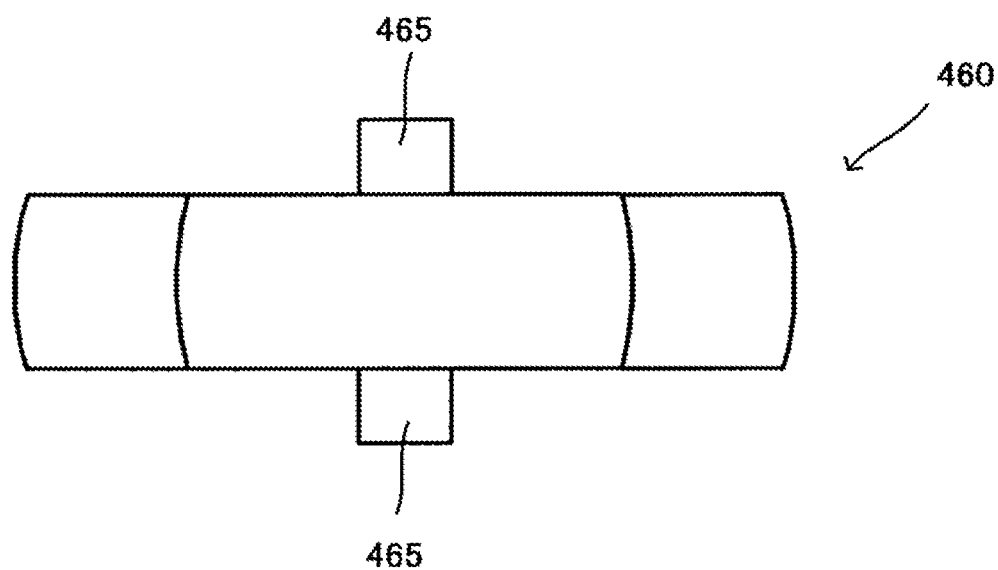
FIG. 27B is a plan view of the intermediate member 460.

The intermediate member 460 is illustrated in FIG. 27. FIG. 27A is a perspective view, and FIG. 27B is a plan view. As can be ascertained from FIG. 27A, the intermediate member 460 is an annular member of which a part is cut out.

The intermediate member 460 is disposed in a groove 450b provided in a holding portion 450 of the main body 445 of which an outer circumferential portion will be described later. Therefore, the outer diameter of the intermediate member 460 has a size which can be inserted into the groove 450b.

Meanwhile, since the base end portion of the shaft member 70 is disposed on the annular inside of the intermediate member 460, a size and an aspect by which the base end portion can be accommodated on the inside of the intermediate member 460 may be employed. In the aspect, since the base end portion of the shaft member 70 is the spherical body 73, the inner diameter of the intermediate member 460 can also be made the same as the diameter of the spherical body 73. In addition, as can be ascertained from FIG. 27B, in the aspect, the inner circumferential surface of the intermediate member 460 is also curved in a direction along the annular shaft line (vertical direction of the paper surface of FIG. 27B). The curvature can match the curvature due to the diameter of the spherical body 73. Accordingly, the combination of the intermediate member 460 and the spherical body 73 is more appropriate.

In addition, the size (that is, the thickness) of the annular shaft line direction of the intermediate member 460 is substantially the same as the groove width of the groove 450b formed in the holding portion 450 of the main body 445 which will be described later. Accordingly, rattling is prevented.

A notch 460a of the intermediate member 460 has a size and a shape by which at least the rotating shaft 72 (refer to FIG. 8) of the shaft member 70 can be disposed on the inside thereof.

The intermediate member 460 is provided with two grooves 461 and 462 which respectively extend in the annular shaft line direction at both end portions thereof. In addition, the two grooves open in directions opposite to each other, and have a snap-fit structure. Both ends of the rotating force transmission pin 60 of the shaft member 70 are respectively inserted into the grooves 461 and 462. Accordingly, the shape and disposition of the grooves 461 and 462 are configured such that the end portions of the rotating force transmission pin 60 can be respectively inserted into the grooves 461 and 462.

Furthermore, on the intermediate member 460, a guide member 465 which functions as a guided guide from each of the annular front and rear surfaces and is along the annular shaft line direction, is disposed to protrude. The position at which the guide member 465 is disposed is not particularly limited, and as will be described later, the guide member 465 may be disposed at a position at which the guide member 465 can slide on the guide surfaces 451 and 452 when the intermediate member 460 is disposed on the main body 445.

A material which configures the intermediate member 460 is not particularly limited, but a resin, such as polyacetal, polycarbonate, or PPS can be used. Here, in order to improve the rigidity of the member, the glass fiber or the carbon fiber may be mixed into the resin in accordance with the load torque. In addition, in order to make the swinging smooth when attaching the intermediate member 460 to the main body 445, sliding properties may be improved by containing at least one type of a fluorine, polyethylene, and silicon rubber in the resin. In addition, the resin may be coated with fluorine or lubricant.

Figure 28A:
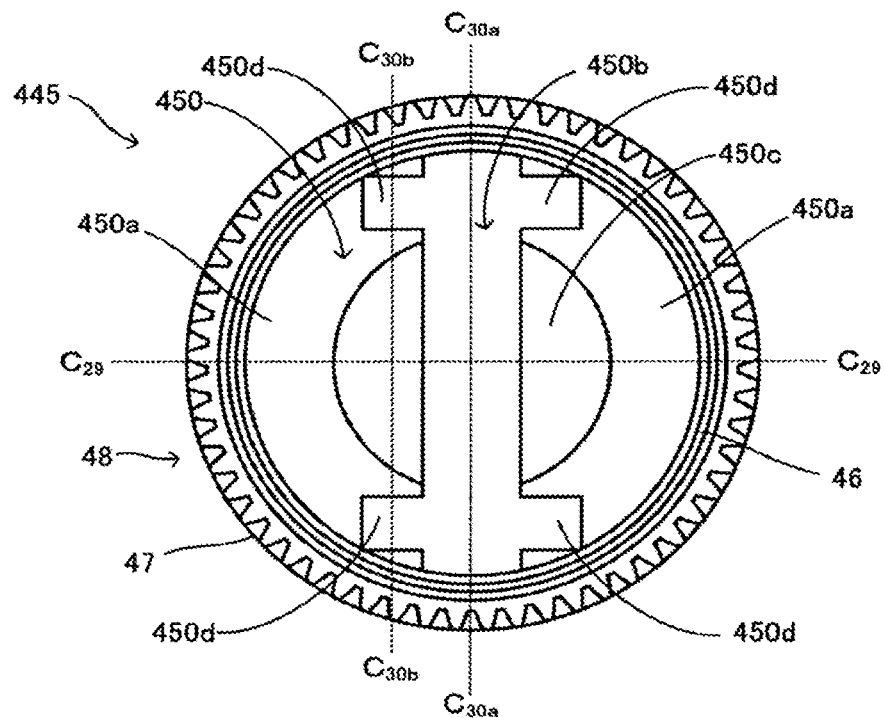
FIG. 28A is a plan view of a main body 445 of the bearing member 441.
Figure 28B:
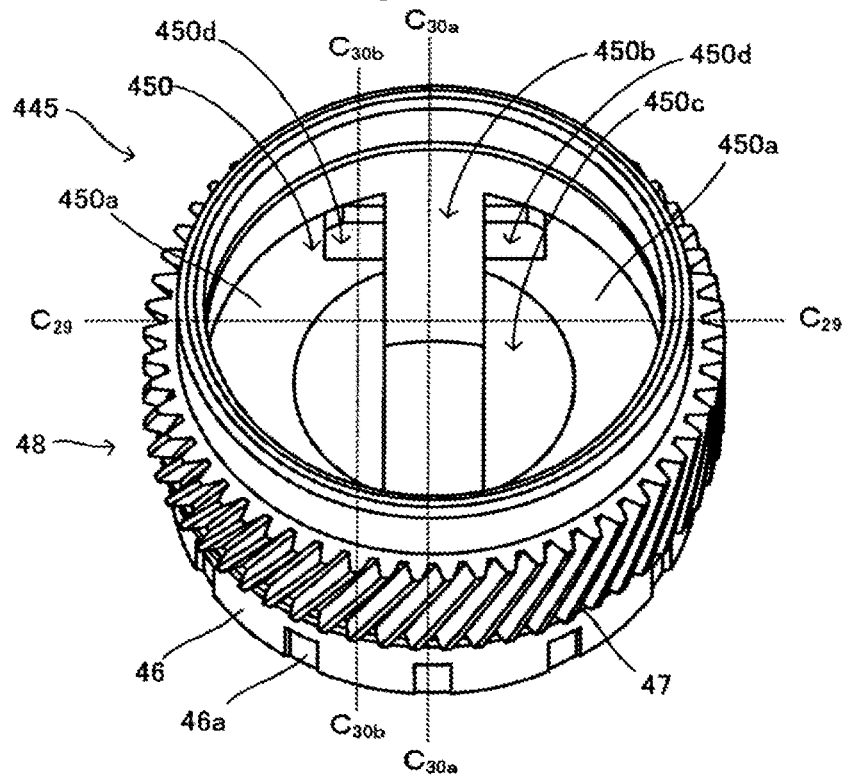
FIG. 28B is a perspective view of the main body 445 of the bearing member 441.
Figure 29:
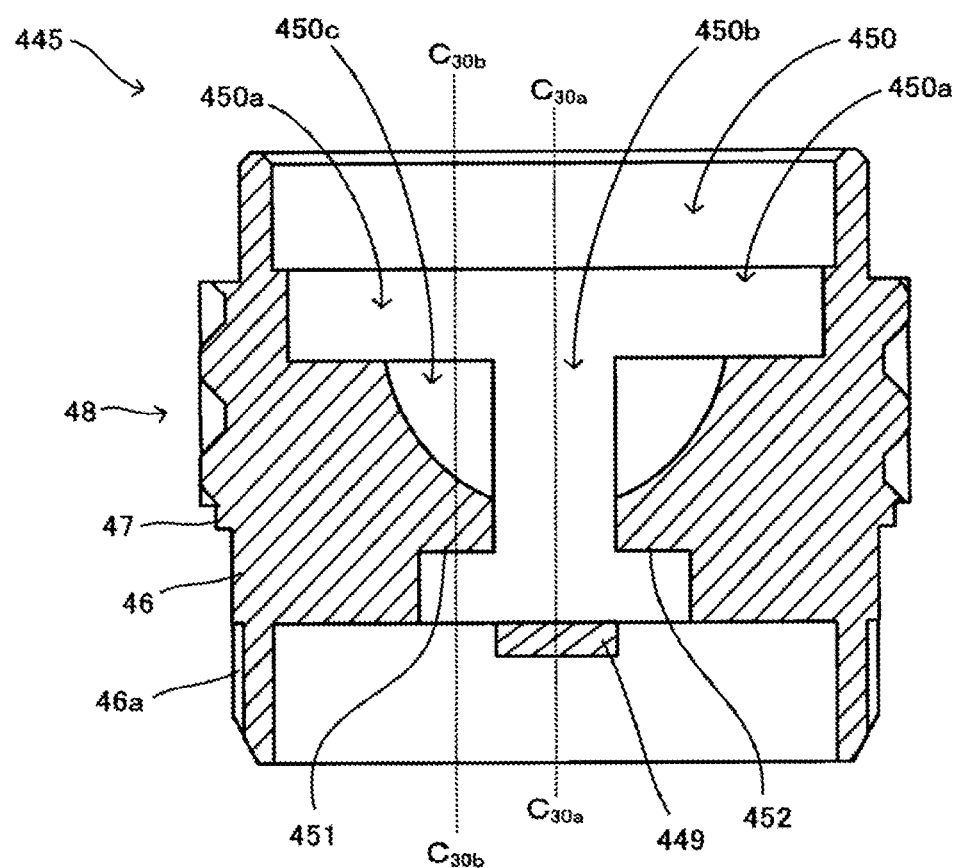
FIG. 29 is a sectional view of the main body 445 of the bearing member 441.
Figure 30A:
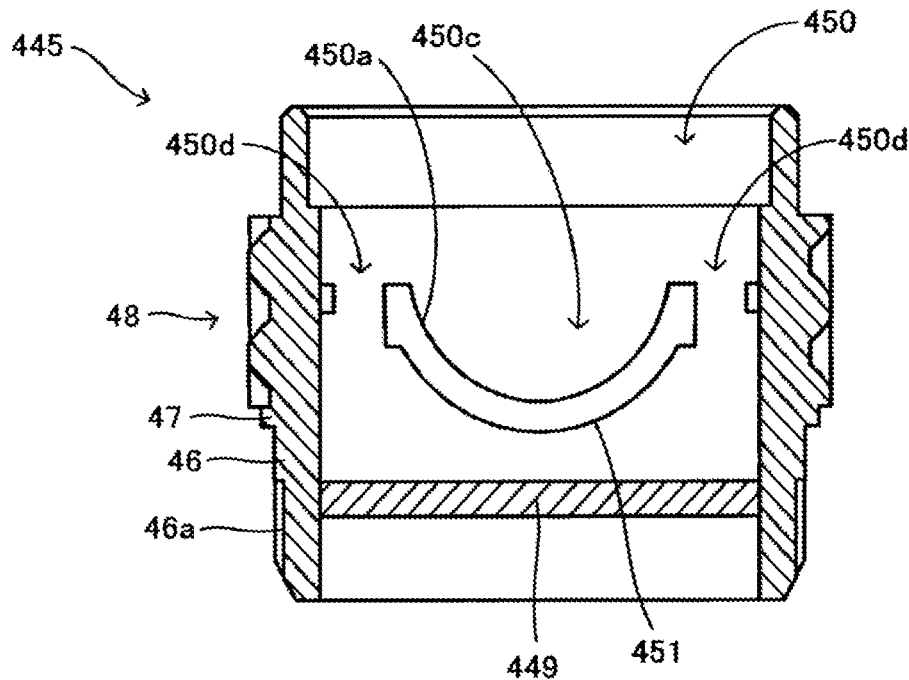
FIG. 30A is another sectional view of the main body 445 of the bearing member 441.
Figure 30B:
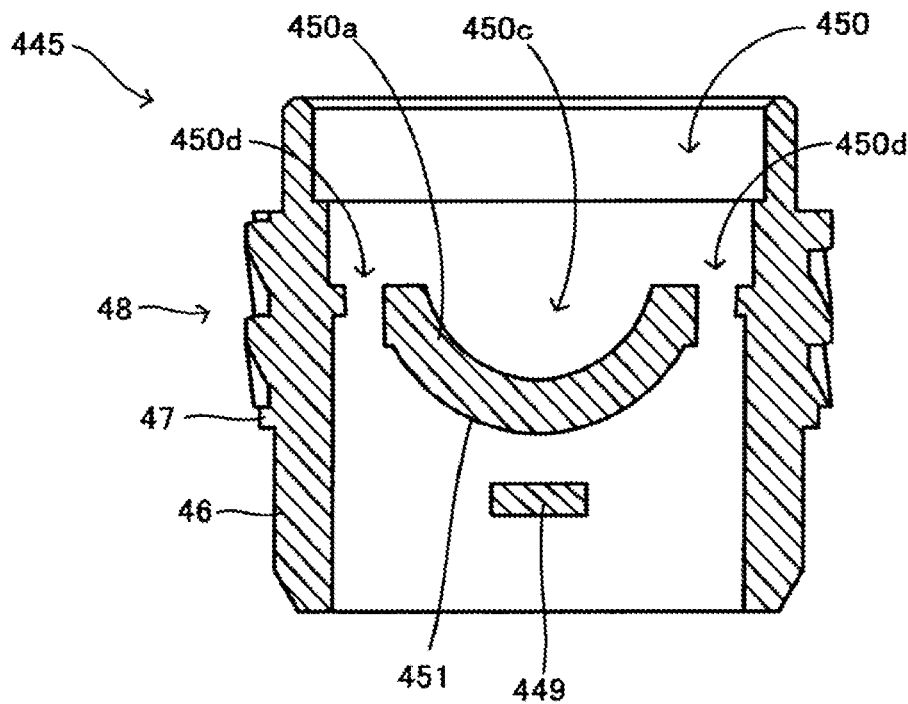
FIG. 30B is another sectional view of the main body 445 of the bearing member 441.

Next, the main body 445 will be described. FIG. 28A illustrates a plan view of the main body 445 as viewed from the side of the main body 445 on which the intermediate member 460 is inserted, and FIG. 28B illustrates a perspective view of the main body 445. In addition, FIG. 29 illustrates a sectional view along the shaft line including the line indicated by $C_{29}$-$C_{29}$ in FIGS. 28A and 28B. Furthermore, FIG. 30A illustrates a sectional view along the shaft line direction including a line indicated by $C_{30a}$-$C_{30a}$ in FIGS. 28A, 28B and 29. In addition, FIG. 30B illustrates a sectional view along the shaft line direction including a line indicated by $C_{30b}$-$C_{30b}$ in FIGS. 28A, 28B and 29.

A bottom portion 449 which extends in a bar shape in the diameter direction of the tubular body 46 is provided on the tubular inside of the tubular body 46 so as to close at least a part of the inside of the tubular body 46. Furthermore, a holding portion 450 is provided on the inside on the side opposite to the side fixed to the photoreceptor drum 35 across the bottom portion 449 on the inside of the tubular body 46.

The holding portion 450 forms guide surfaces 451 and 452 as intermediate member guides on the inside of the tubular body 46. Therefore, the holding portion 450 is disposed such that two protruding portions 450a face each other so as to protrude from the inner surface of the tubular body 46 toward the shaft line of the tubular body 46, and the groove 450b is formed between the two protruding portions 450a.

The aspect of the holding portion 450 will be described in more detail.

As can be clearly ascertained from FIGS. 28A and 28B, two protruding portions 450a are disposed to face each other, and a gap is formed therebetween to configure the groove 450b. In addition, regarding the protruding portion 450a, in the protruding portion 450a, a recess portion 450c formed of a spherical part having the center on the shaft line of the tubular body 46, is formed. A part of a spherical surface of the recess portion 450c has a shape by which the spherical body 73 of the shaft member 70 can be received. However, the recess portion 450c is not necessarily a part of a spherical surface.

In addition, guide surfaces 451 and 452 are formed on the surface opposite to the recess portion 450c in the protruding portion 450a.

Furthermore, in the holding portion 450, a guide member insertion groove 450d is provided between the tubular body 46 and the recess portion 450c on the end surface of the protruding portion 450a. The guide member insertion groove 450d is provided so as to communicate the recess portion 450c side and the guide surfaces 451 and 452 side to each other, and one end of the guide member insertion groove 450*d* is opened through the groove 450*b*. The size and shape of the guide member insertion groove 450*d* are formed such that the guide member 465 (refer to FIG. 31B) of the intermediate member 460 can be inserted.

In the aspect, the guide member insertion grooves 450*d* are provided on one side and the other side of the groove 450*b*, respectively. However, it is not necessary to provide the guide member insertion grooves 450*d* on both sides, and only one of the guide member insertion grooves 450*d* may be provided. Accordingly, as will be described later, when the guide member 465 of the intermediate member 460 moves along the guide surfaces 451 and 452 of the holding portion 450, the guide member 465 is not hooked to the guide member insertion groove 450*d*, and thus, the guide member 465 smoothly moves. In addition, even when the shaft member 70 is inadvertently pulled or the like, it is also possible to prevent the unintentional detachment of the shaft member 70.

In addition, it is also possible to provide a groove (not illustrated) which communicates with any of the protruding portions 450*a* from the viewpoint of manufacturing the end member, such as disposition of a mold, in the shaft line direction. At this time, since the groove is formed to be thinner than the guide member 465, the smoothing of the swing of the shaft member 70 is maintained.

As described above, a surface is also formed on the side opposite to the recess portion 450*c* in the protruding portion 450*a* (that is, on the side opposing the bottom portion 449 of the holding portion 450), and the surface has an arc shape as can be ascertained from FIG. 30B and the like. This is guide surfaces 451 and 452. The guide surfaces 451 and 452 have curved surfaces formed so as to curve along the direction in which the grooves 450*b* extend. As the guide member 465 of the intermediate member 460 slides on the guide surfaces 451 and 452, the shaft member 70 swings similar to the description above.

Therefore, the guide member insertion groove 450*d* communicates the recess portion 450*c* side of the protruding portion 450*a* and the rear surface of the holding portion 450 (the surface on which the guide surfaces 451 and 452 exist) with each other, and the guide member 465 reaches the guide surfaces 451 and 452.

It is preferable that the holding portion 450 having such a shape is further formed as follows.

The groove width of the groove 450*b* is not particularly limited, but it is preferable to be approximately the same as the thickness of the intermediate member 460. Accordingly, rattling of the shaft member 70 can be suppressed.

The shape of the inner surface of the recess portion 450*c* is not particularly limited as long as the shape is capable of receiving the base end portion of the shaft member 70, but when the base end portion of the shaft member 70 is the spherical body 73, it is preferable that the curved surface having a radius which is the same as that of the spherical body 73. Accordingly, rattling of the shaft member 70 can be prevented.

It is preferable that the guide member insertion groove 450*d* can insert the guide member 465 of the intermediate member 460 and has a snap-fit (interference fit of the entrance portion) structure with respect to the guide member 465.

Since the guide surfaces 451 and 452 are surfaces for determining the swing of the shaft member 70, it is preferable that the guide surfaces 451 and 452 have an arc shape in the section illustrated in FIG. 30B from the viewpoint of obtaining stable swing. In other words, it is preferable that the guide surfaces 451 and 452 have an arc shape in which the center of the swing of the shaft member 70 is regarded as the center. Accordingly, smooth swinging is possible. In addition, in the aspect, the arc of the recess portion 450*c* is also an arc included in the concentric circle of the circle in which the guide surfaces 451 and 452 are included.

Figure 31A:
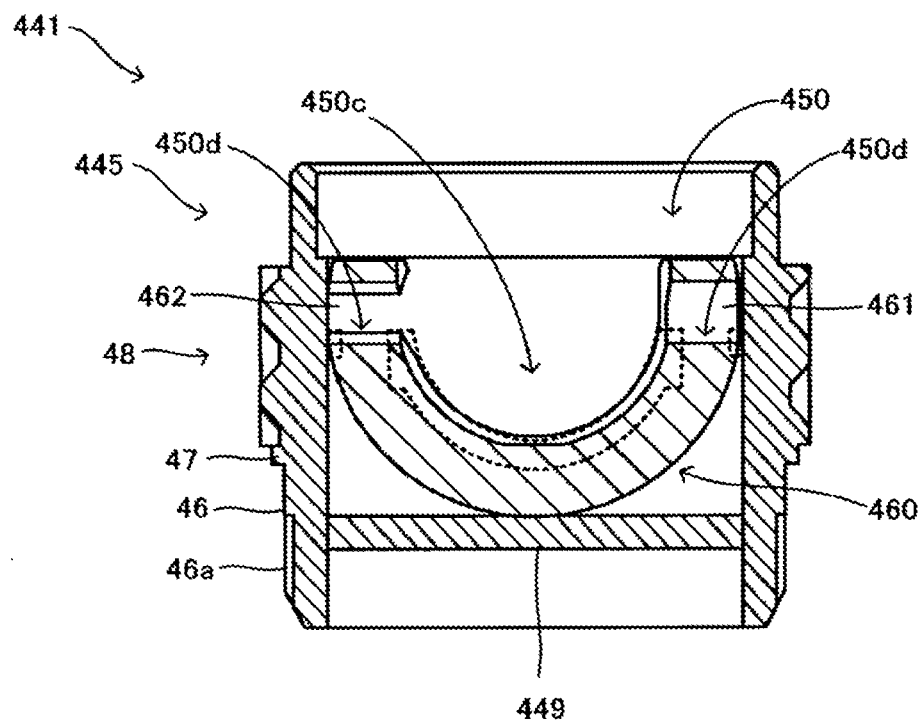
FIG. 31A is a sectional view of the bearing member 441.
Figure 31B:
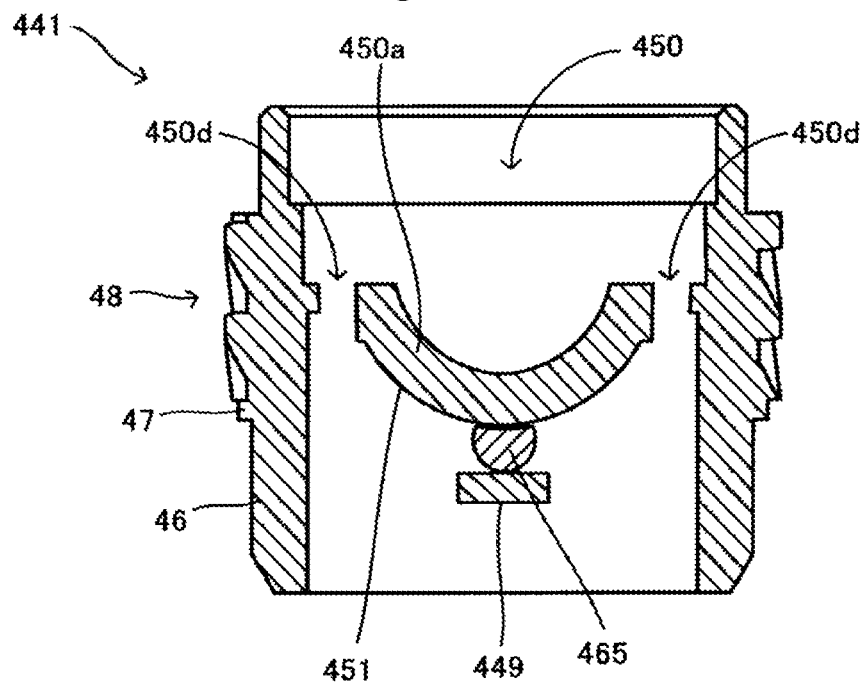
FIG. 31B is another sectional view of the bearing member 441.

FIG. 31 illustrates a view in which the main body 445 is combined with the intermediate member 460 to form the bearing member 441. FIG. 31A is a view from the same viewpoint as that of FIG. 30A, and FIG. 31B is a view from the same viewpoint as that of FIG. 30B. FIG. 32 is a view illustrating a state of movement of the guide member 465 when the intermediate member 460 is combined with the main body 445.

As can be ascertained from the drawings, in the bearing member 441, the guide member 465 of the intermediate member 460 passes through the guide member insertion groove 450*d* and reaches the bottom portion 449 side (in the order indicated by the straight arrows in FIG. 32), and is disposed at a position at which the guide member 465 can slide on the guide surface 451 and 452. In addition, as the guide member 465 slides on the guide surfaces 451 and 452, the intermediate member 460 is guided, and as a result, the intermediate member 460 can rotate on the inside of the main body 445.

In addition, the intermediate member 460 is disposed in the groove 450*b* such that the thickness direction of the intermediate member 460 is the groove width direction of the groove 450*b* formed in the holding portion 450. Therefore, a part of the intermediate member 460 is disposed in the groove 450*b*, and the intermediate member 460 can rotate (swing) so as to slide in the groove 450*b*.

Furthermore, in the bearing member 441 of the aspect, as can be ascertained from FIG. 31A, when a posture in which both ends of the intermediate member 460 are aligned in the direction orthogonal to the shaft line of the main body 445 (the diameter direction of the main body 445) is achieved, a structure in which the grooves 461 and 462 of the intermediate member 460 protrude and is exposed from the protruding portion 450*a* formed in the holding portion 450 of the main body 445, is achieved. Therefore, in the aspect, the shaft member 70 can also be attached to the main body 445 after combining the intermediate member 460, and the assembly can be performed more easily with high productivity. In addition, since it is easier to remove only the shaft member 70, reuse is also easy. In particular, at this time, since there is no need to deform the shaft member 70 when insertion and separation are performed, the concern of scratches and the like is eliminated. In addition, since separation is easy, workability can also be improved.

In this manner, the shaft member 70 is combined with the intermediate member 460 of the bearing member 441 of the aspect to form the end member. In addition, with the end member, the intermediate member 460 is held by the guide surfaces 451 and 452 formed on the main body 445 so as not to come off, and the shaft member 70 is held by the intermediate member 460 so as not to come off. Therefore, the shaft member 70 is not directly held by the main body 445.

FIG. 33 illustrates a sectional view illustrating a situation in which the shaft member 70 is combined with the bearing member 441 and the shaft member 70 swings. As can be ascertained from FIG. 33, in the aspect, the intermediate member 460 is swingably attached to the main body 445, and the shaft member 70 is attached to the intermediate member 460 via the rotating force transmission pin 60.

Therefore, in addition to the swing caused by the relationship between the rotating force transmission pin 60 and the hole 74 of the shaft member 70, the shaft member 70 can also swing by the swinging of the intermediate member 460. In addition, although not illustrated, the shaft member 70 can also swing around the shaft line of the rotating force transmission pin 60.

The bearing member 441 also exhibits the above-described effect.

Figure 34:
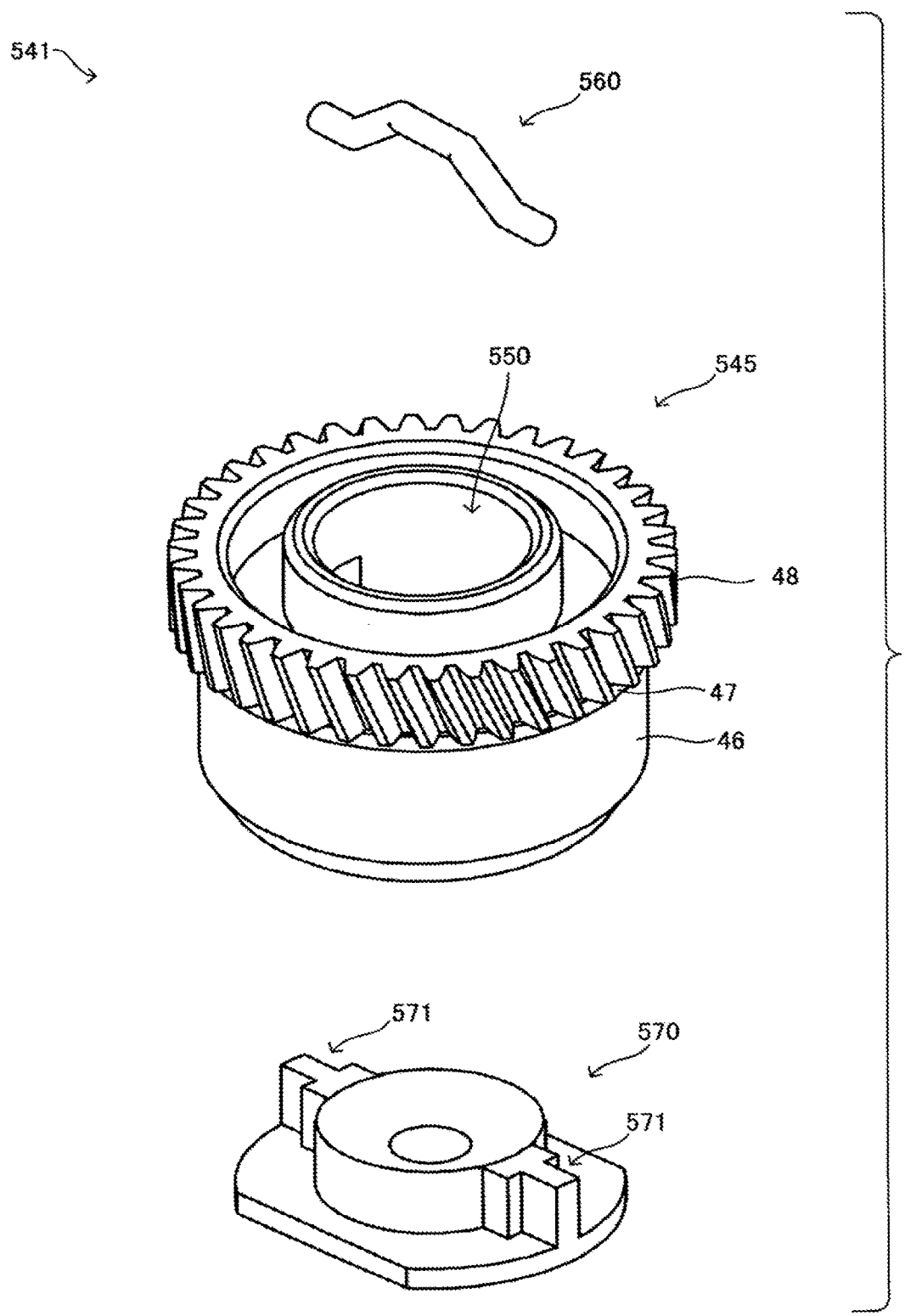
FIG. 34 is an exploded perspective view of a bearing member 541.

FIG. 34 is an exploded perspective view of the bearing member 541. The bearing member 541 is configured to include a main body 545, a rotating force transmission pin 560, and a lid material 570. When forming the photoreceptor drum unit with the bearing member 541, since the members described above can be applied to members other than the bearing member, the description thereof will be omitted here, and the bearing member 541 will be described.

Figure 35A:
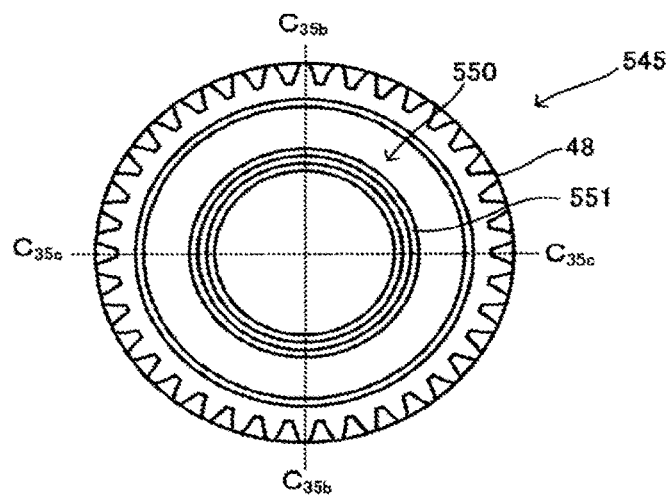
FIG. 35A is a plan view of a main body 545.
Figure 35B:
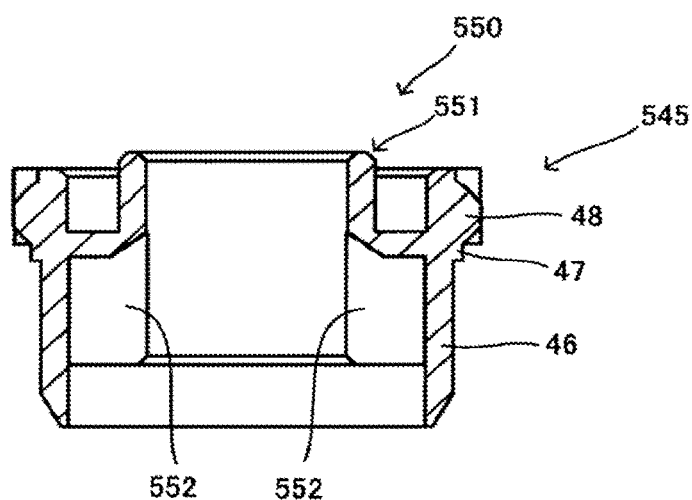
FIG. 35B is one sectional view of the main body 545.
Figure 35C:
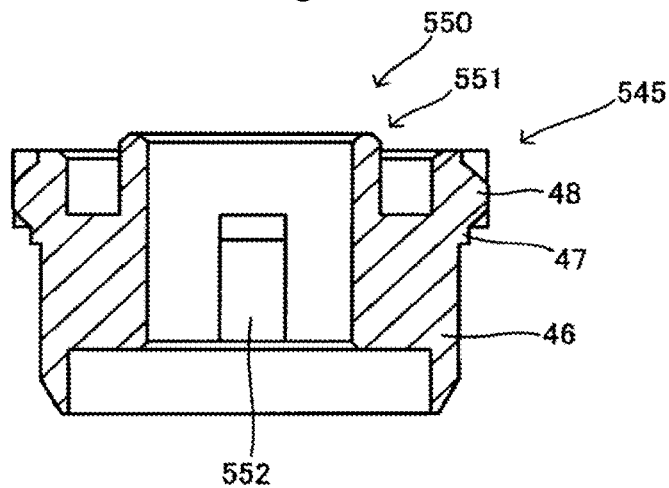
FIG. 35C is another sectional view of the main body 545.

FIG. 35A illustrates a view (plan view) of the main body 545 when viewed from the side on which the shaft member 70 protrudes, FIG. 35B illustrates a sectional view along the line indicated by $C_{35b}$-$C_{35b}$ in FIG. 35A, and FIG. 35C illustrates a sectional view along the line indicated by $C_{35c}$-$C_{35c}$ in FIG. 35A.

In the aspect, the main body 545 includes a cylindrical tubular body 46. In addition, on the outer circumferential surface of the tubular body 46, a ring-shaped contact wall 47 and a gear 48 are formed to stand upright along the outer circumferential surface. The outer diameter of the tubular body 46 is substantially the same as the inner diameter of the photoreceptor drum 35, one end side of the tubular body 46 is inserted into the photoreceptor drum 35 and fitted thereto, and accordingly, the main body 545 is fixed to the photoreceptor drum 35. At this time, the end surface of the photoreceptor drum 35 is inserted to a depth at which the end surface abuts against the contact wall 47. At this time, an adhesive may be used for more firm fixation. In addition, grooves or irregularities may be provided in the tubular body 46 of the part at which the adhesive is disposed. Accordingly, the adhesive is held in the groove and a recess portion, and the adhesion between the photoreceptor drum 35 and the main body 545 is further strengthened.

The gear 48 is a gear which transmits the rotating force to the developing roller unit 23, and in the aspect, a helical gear is disposed. The type of the gear is not particularly limited, and may be a spur gear or the like. However, gears are not necessarily provided.

A holding portion 550 is provided on the inside of the tubular body 46 which has a tubular shape. The holding portion 550 is a part which holds the rotating force transmission pin 560 and encloses one end side of a shaft member 70 on the inside thereof. The holding portion 550 is provided with a shaft member accommodation portion 551 and a pin holding portion 552.

The shaft member accommodation portion 551 is a member which accommodates one end side of the shaft member 70 on the inside thereof, and forms the pin holding portion 552. In the aspect, the shaft member accommodation portion 551 is a tubular body which is coaxial to the tubular body 46.

The pin holding portion 552 is a part which is formed in the shaft member accommodation portion 551, holds one end and the other end of the rotating force transmission pin 560, and accordingly, holds the rotating force transmission pin 560 to the main body 445. As can be ascertained from FIG. 35B, the pin holding portions 552 are provided at two locations to oppose each other across the shaft line of the tubular body 46.

Figure 36:
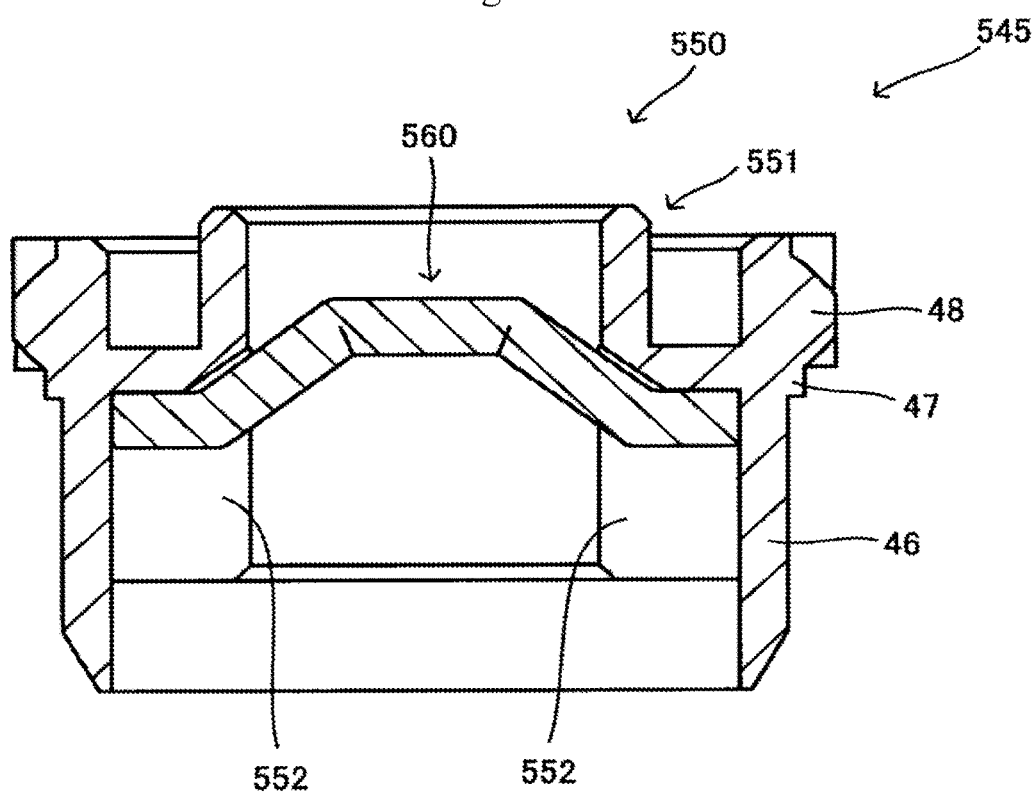
FIG. 36 is a sectional view illustrating a situation in which a rotating force transmission pin 560 is attached to the main body 545.

As can be ascertained from FIGS. 35B and 35C, the pin holding portion 552 of the aspect is formed of a groove which supports the side surface of the end portion of the rotating force transmission pin 560. As can be ascertained from FIG. 35B, a part of the end surface of the groove has a taper. The part is inclined to the folded inclination of the rotating force transmission pin 560 (refer to FIG. 36).

In the aspect, when mounting the rotating force transmission pin 560 on the pin holding portion 552, the pin holding portion 552 is configured so as not to attach the rotating force transmission pin 560 to the main body 545 from the sides (lower sides of paper surfaces of FIGS. 35B and 35C) opposite to the side on which the shaft member 70 protrudes. In other words, the groove of the pin holding portion 552 is configured to be open on the side opposite to the side on which the shaft member 70 protrudes (lower sides of the paper surfaces of FIGS. 35B and 35C), and the rotating force transmission pin 560 has an end surface in the direction in which the shaft member 70 protrudes.

A material which configures the main body 545 is not particularly limited, but a resin, such as polyacetal, polycarbonate, or PPS can be used. Here, in order to improve the rigidity of the member, the glass fiber or the carbon fiber may be mixed into the resin in accordance with the load torque. In addition, in order to make the swinging smooth when attaching the shaft member 70 to the main body 545, sliding properties may be improved by containing at least one type of a fluorine, polyethylene, and silicon rubber in the resin. In addition, the resin may be coated with fluorine or lubricant.

As can be ascertained from FIG. 34, the rotating force transmission pin 560 has a bar shape and both end portions thereof are coaxial to each other, but in the center portion, the rotating force transmission pin 560 is formed by being bent such that the shaft line is parallel to both end portions. In addition, both end portions and the center portion are formed to be tapered and inclined.

The lid material 570 is a member which is attached to the main body 545 from the side opposite to the side on which the shaft member 70 protrudes, and which is disposed such that the rotating force transmission pin 560 does not come out. Therefore, the lid material 570 of the aspect has a projection 571 to be inserted into the groove of the pin holding portion 552.

Figure 37A:
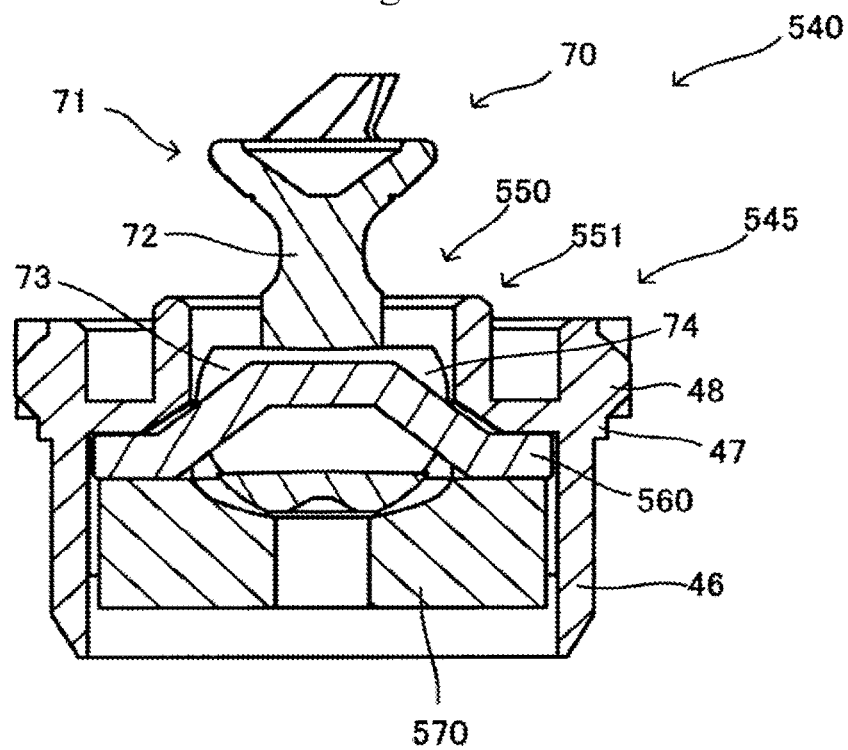
FIG. 37A is one sectional view of the end member 540.

By combining the bearing member 541 and the shaft member 70 with each other as follows, the end member 540 is made. By describing the combination, the shape, the size, or the positional relationship of the bearing member 541 and the shaft member 70 are further understood. FIG. 37A illustrates a sectional view of the end member 540 from the same viewpoint as in FIG. 35C, and FIG. 37B illustrates a sectional view of the end member 540 from the same viewpoint as FIG. 35C, respectively.

Figure 37B:
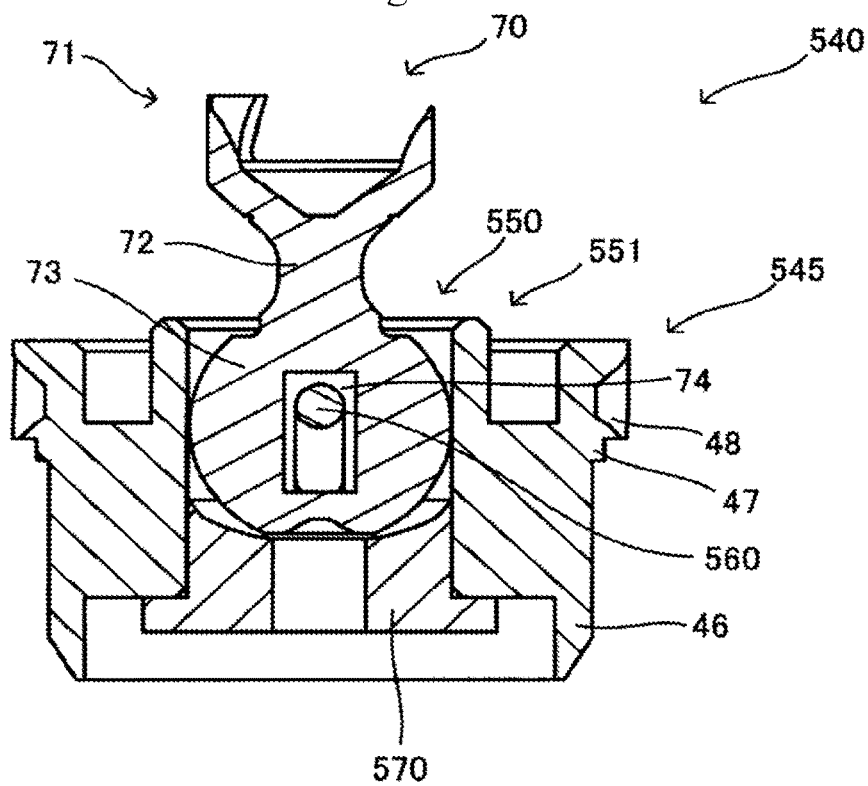
FIG. 37B is another sectional view of the end member 540.

As can be ascertained from FIGS. 37A and 37B, the rotating force transmission pin 560 is inserted into the hole 74 provided in the spherical body 73 of the shaft member 70, and both ends of the rotating force transmission pin 560 are respectively disposed to protrude from the spherical body 73. In addition, both ends of the protruding rotating force transmission pin 560 are held by the pin holding portion 552. When disposing the rotating force transmission pin 560 on the pin holding portion 552, the shaft member 70 is moved in the groove of the pin holding portion 552 from the side opposite to the side on which the shaft member 70 protrudes from the bearing member 541, and is hooked to the end portion of the groove. In addition, the lid material 570 is attached from the opposite side, and the rotating force transmission pin 560 is held on the main body 545.

In this manner, according to the bearing member 541, it is possible to form the bearing member 541 only by shifting the pin holding portion 552 to the side opposite to the side on which the shaft member 70 protrudes, and the assembly becomes easy.

With the end member 540, the shaft member 70 can smoothly swing in the same manner as described above.

The invention contains subject matter related to Japanese Patent Application No. 2015-222469 filed in the Japanese Patent Office on Nov. 12, 2015, the entire contents of which are incorporated herein by reference.

REFERENCE SIGNS LIST 10 image forming apparatus main body (apparatus main body)
20 process cartridge
30 photoreceptor drum unit
35 photoreceptor drum (columnar rotating body)
40, 140, 240, 340, 440, 540 end member
41, 141, 241, 341, 441, 541 bearing member
45, 145, 345, 445, 545 main body
50, 150, 350, 450, 550 holding portion
70 shaft member

The invention claimed is:

1. An end member which is disposed in an end portion of a columnar rotating body, the end member comprising:
a shaft member; and
a bearing member to which the shaft member is attached, wherein:
the shaft member includes
a rotating shaft,
a rotating force receiving portion which is provided on one end side of the rotating shaft, is engageable with a rotating force applying portion of an image forming apparatus main body, and receives a rotating force from a driving shaft in an engaged posture,
a base end portion which is disposed on the other end side of the rotating shaft, and
a rotating force transmission pin for transmitting the rotating force to a bearing member:
a hole through which the rotating force transmission pin passes is provided in the base end portion, and the shaft member is capable of swinging as the hole is greater in size with respect to the rotating force transmission pin; and
the bearing member includes
a tubular body,
a holding portion which is disposed on an inside of the tubular body, and is a recess portion that holds the rotating force transmission pin,
a projection-like regulating member which extends in the circumferential direction for regulating attachment and detachment of the rotating force transmission pin, and
a groove which extends in a circumferential direction in order to enable the projection-like regulating member to flex in a radial direction when a biasing force is applied to the projection-like regulating member via the rotating force transmission pin.

2. The end member according to claim 1, wherein the projection-like regulating member is an elastic member.

3. The end member according to claim 1, wherein the projection-like regulating members are provided to oppose each other across a shaft line of the tubular body, and an interval of opposing regulating members becomes narrower along the circumferential direction of the tubular body.

4. The end member according to claim 1, wherein a tip end of the rotating force transmission pin is configured to be capable of moving a part at which the projection-like regulating member is disposed, in a state where the shaft member is disposed to match a rotating shaft line on the inside of the tubular body.

5. A photoreceptor drum unit, comprising:
the end member according to claim 1, and
a photoreceptor drum which is the columnar rotating body.

6. A process cartridge, comprising:
a housing; and
the photoreceptor drum unit according to claim 5 which is held by the housing.

7. The end member according to claim 1, wherein the hole is greater in diameter in the shaft line direction than a diameter of the rotating force transmission pin, such that the shaft member is capable of the swinging and is capable of moving in the shaft line direction.

8. The end member according to claim 1, wherein the holding portion comprise an engaging portion that engages end portions of the rotating force transmission pin enabling the rotating force transmission pin to be fixed into the end portion following engagement of the shaft member into the bearing member.

* * * * *